United States Patent
Stephenson et al.

(10) Patent No.: US 10,414,591 B1
(45) Date of Patent: Sep. 17, 2019

(54) BELT CONTACT SURFACE WITH INSERTS, AND A CONVEYOR SYSTEM USING SAME

(71) Applicant: Stephenson Technologies Inc., Barrie (CA)

(72) Inventors: Robert Roy Stephenson, Barrie (CA); Bartholomew John Boelryk, Barrie (CA)

(73) Assignee: Stephenson Technologies Inc., Barrie (CA)

(*) Notice: Subject to any disclaimer, the term of this patent is extended or adjusted under 35 U.S.C. 154(b) by 0 days.

(21) Appl. No.: 16/281,653

(22) Filed: Feb. 21, 2019

(51) Int. Cl.
| | |
|---|---|
| *B65G 15/62* | (2006.01) |
| *B60S 3/00* | (2006.01) |
| *B65G 15/30* | (2006.01) |
| *B65G 45/22* | (2006.01) |

(52) U.S. Cl.
CPC .............. *B65G 15/30* (2013.01); *B60S 3/004* (2013.01); *B65G 15/62* (2013.01); *B65G 45/22* (2013.01)

(58) Field of Classification Search
CPC ........ B65G 15/60; B65G 15/62; B65G 45/22; B65G 21/00; B65G 2201/0294; B60S 3/04; B60S 3/004
USPC ........................................ 198/837, 841, 495
See application file for complete search history.

(56) References Cited

U.S. PATENT DOCUMENTS

| | | | | |
|---|---|---|---|---|
| 2,446,936 | A * | 8/1948 | Leithmann, Jr. ....... | B65G 17/06 198/841 |
| 3,338,386 | A | 8/1967 | Riabouchinsky et al. | |
| 4,226,325 | A | 10/1980 | Vandas | |
| 4,300,721 | A | 11/1981 | Rich | |
| 4,889,147 | A | 12/1989 | Chandler | |
| 5,040,549 | A * | 8/1991 | Ray ........................ | A24B 7/14 131/117 |
| 5,111,929 | A | 5/1992 | Pierick et al. | |
| 5,779,027 | A * | 7/1998 | Ensch .................. | B65G 17/086 198/841 |
| 6,270,305 | B1 * | 8/2001 | Orbeck .................. | B65G 15/62 198/841 |
| 6,360,879 | B1 | 3/2002 | Crawford | |
| 6,978,880 | B2 | 12/2005 | Barrett | |

(Continued)

FOREIGN PATENT DOCUMENTS

| | | |
|---|---|---|
| CA | 2929335 A1 | 8/2017 |
| JP | 5-162842 | 6/1993 |

OTHER PUBLICATIONS

Office Action for U.S. Appl. No. 16/219,501 dated Apr. 2, 2019.
International Search Report and Written Opinion for PCT/CA2018/051594 dated Apr. 15, 2019.

*Primary Examiner* — James R Bidwell
(74) *Attorney, Agent, or Firm* — Millman IP Inc.

(57) ABSTRACT

A conveyor system is provided, including an endless belt and a support deck. The endless belt is mounted in a longitudinal direction through a service line, the endless belt having an upper transport portion adapted to move a wheeled structure through the service line, and a lower return portion. The support deck is positioned below the upper transport portion of the endless belt to support the endless belt. The support deck has a belt contact surface extending along a top of the support deck and in contact with the upper transport portion of the endless belt. The belt contact surface is at least partially constructed from a material that is at least partially a polymer, and has a set of inserts having a greater abrasion resistance than the material.

19 Claims, 35 Drawing Sheets

(56) References Cited

U.S. PATENT DOCUMENTS

| | | | |
|---|---|---|---|
| 7,527,144 B2 * | 5/2009 | Ostman | B65G 15/62 198/823 |
| 9,650,218 B1 | 5/2017 | Stephenson et al. | |
| 2005/0103363 A1 | 5/2005 | Roles, Jr. | |
| 2008/0121254 A1 | 5/2008 | Barreyre et al. | |
| 2010/0328399 A1 * | 12/2010 | Williams | B65D 27/04 347/49 |
| 2011/0272256 A1 * | 11/2011 | Warren, Jr. | A63D 5/00 198/841 |
| 2014/0251762 A1 | 9/2014 | Grill | |

\* cited by examiner

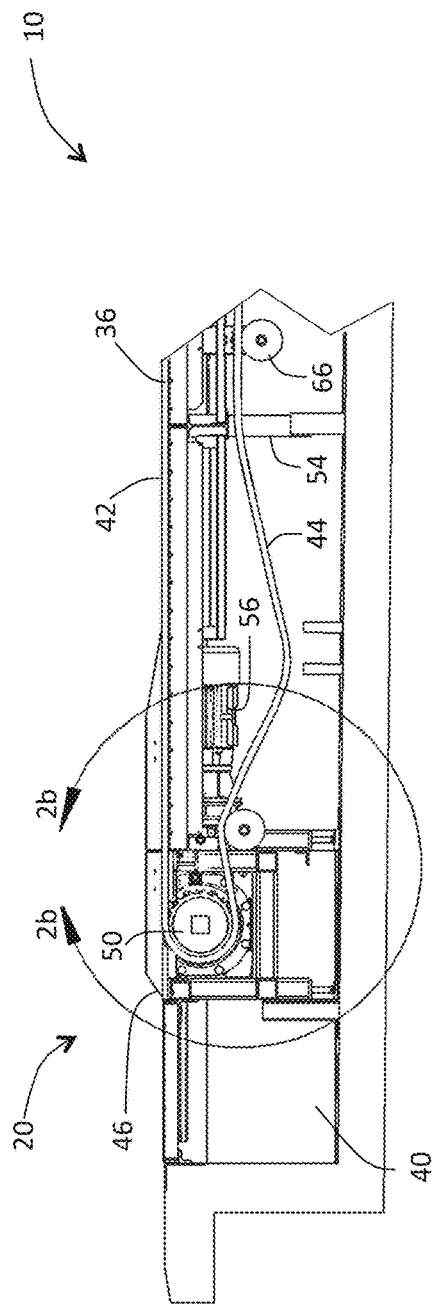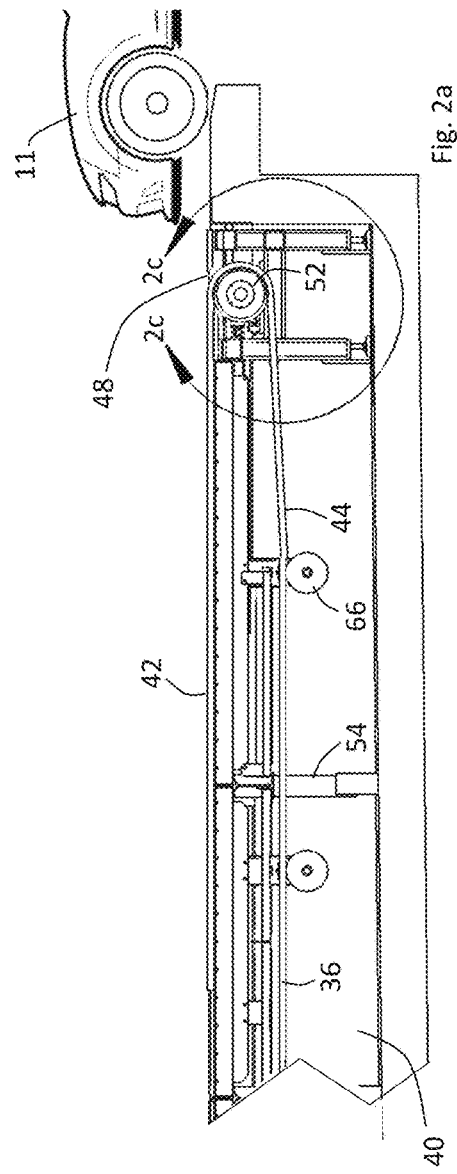
Fig. 2a

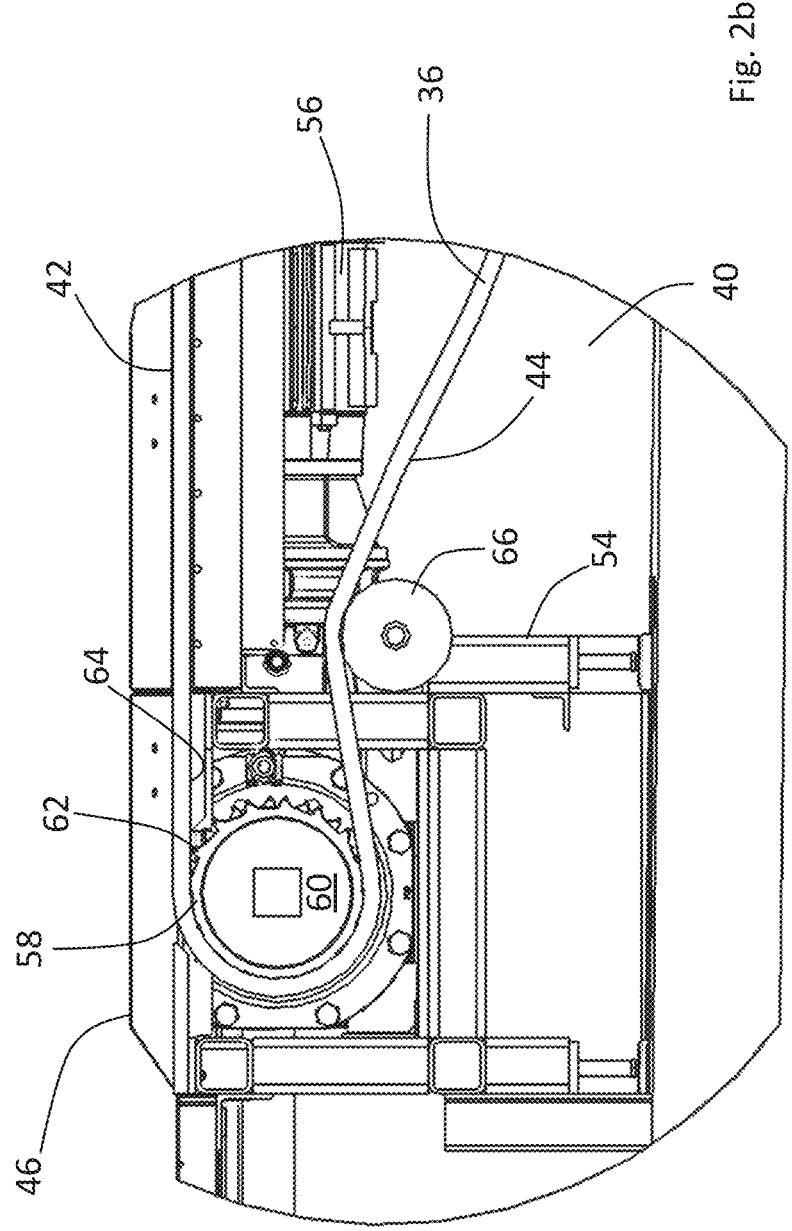

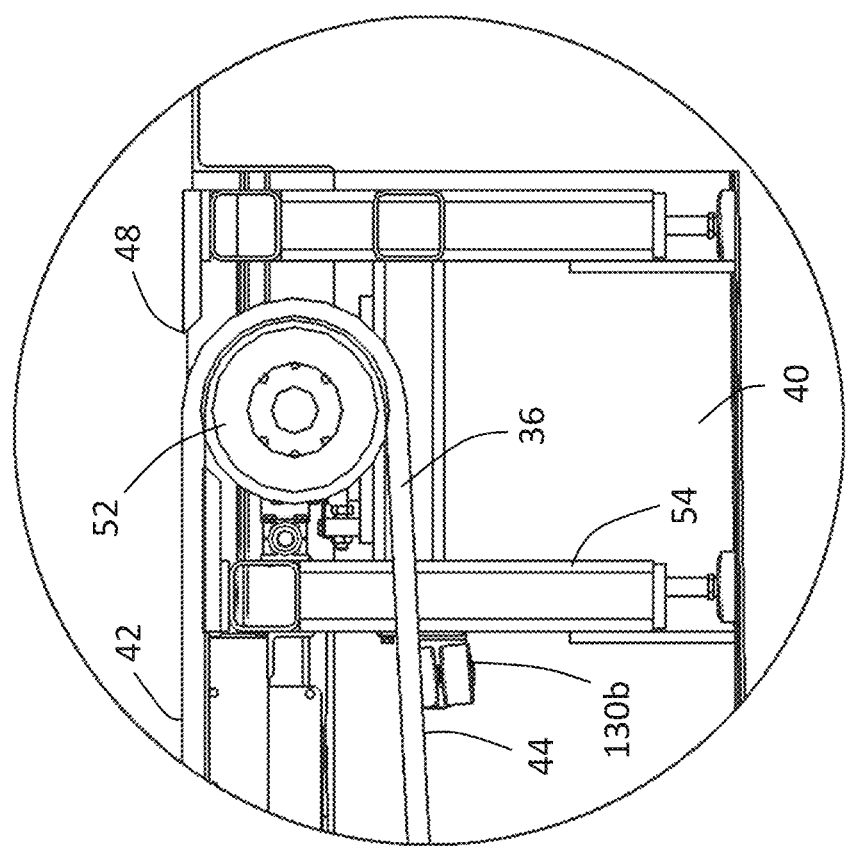

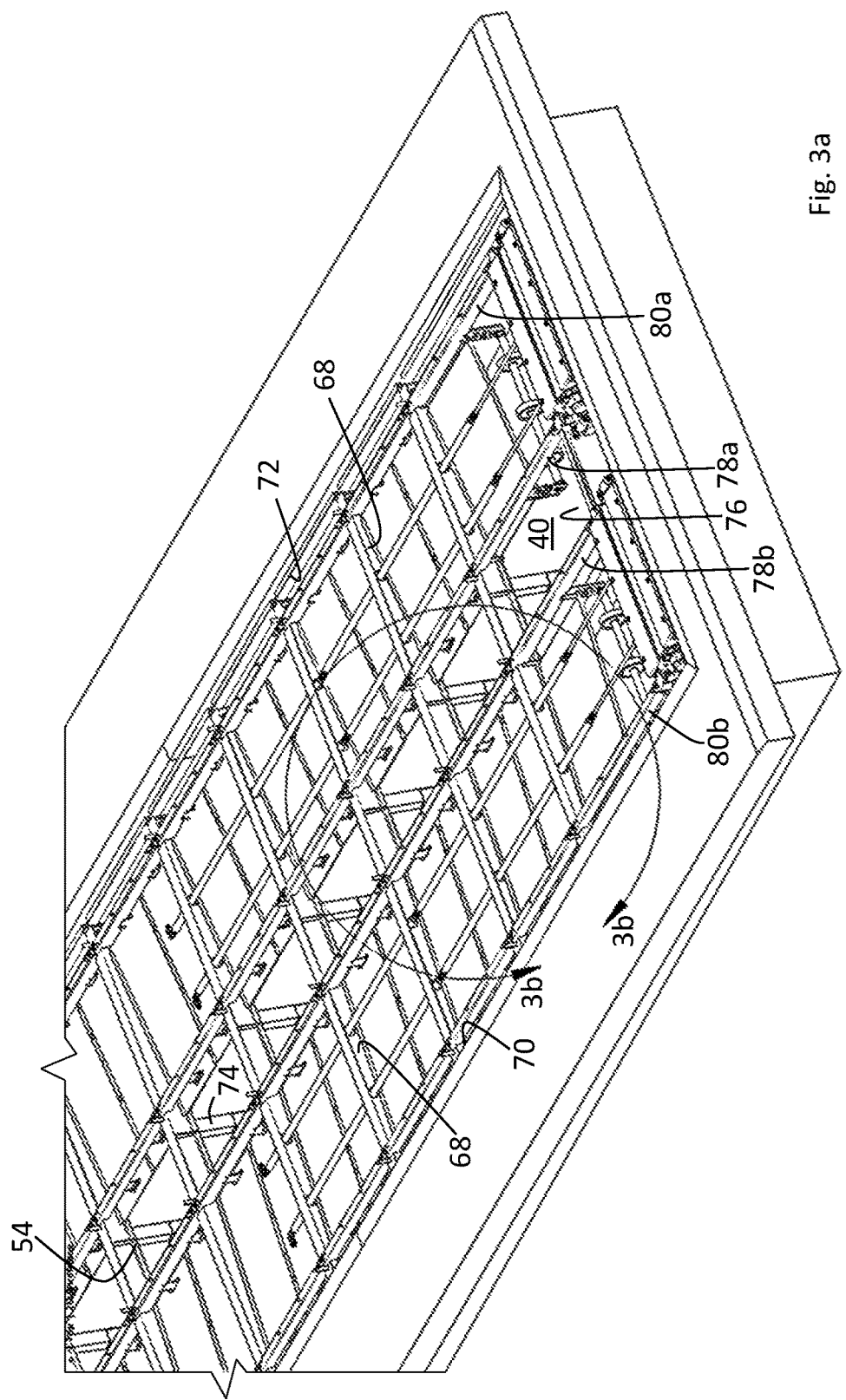

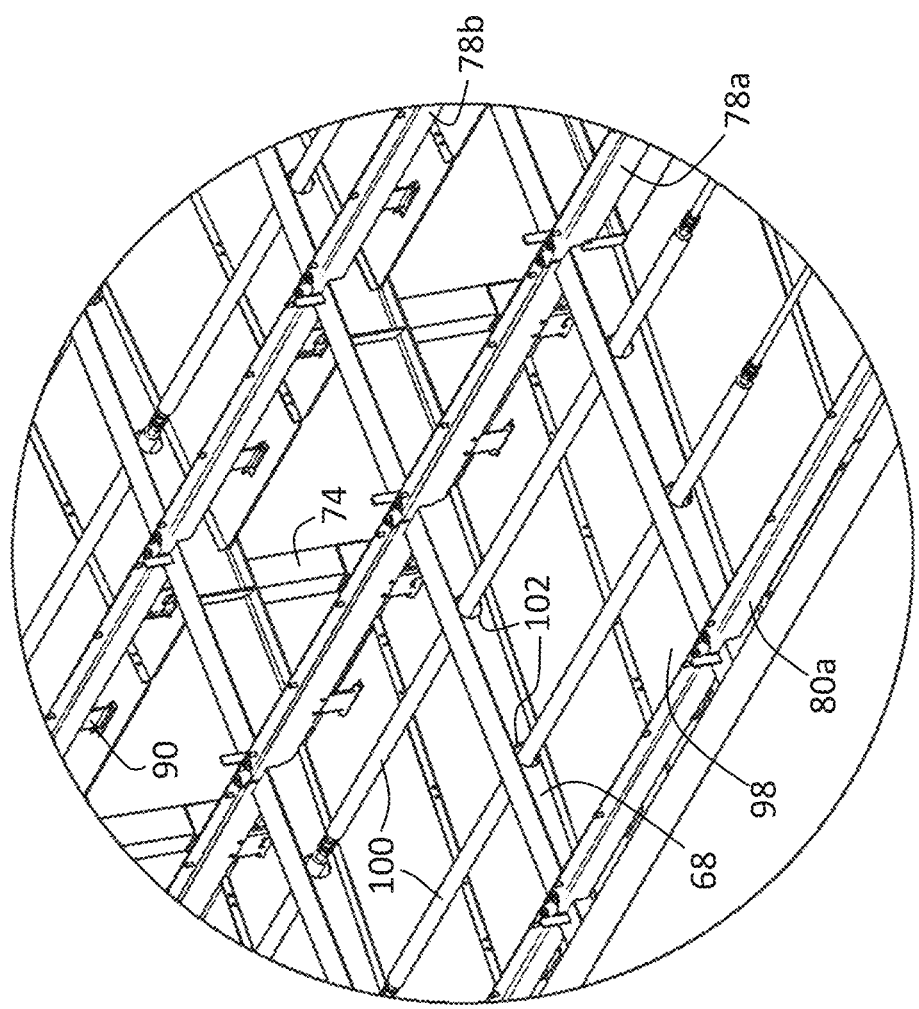

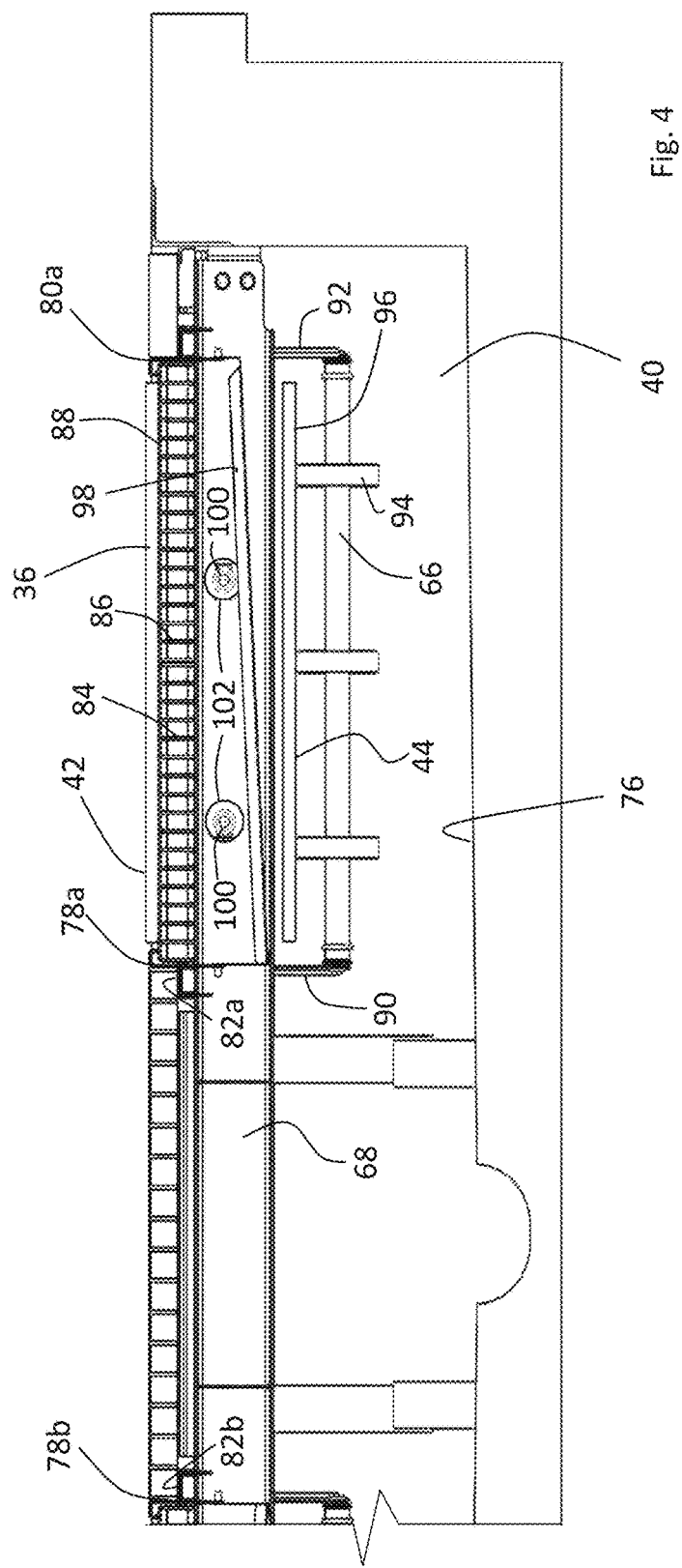

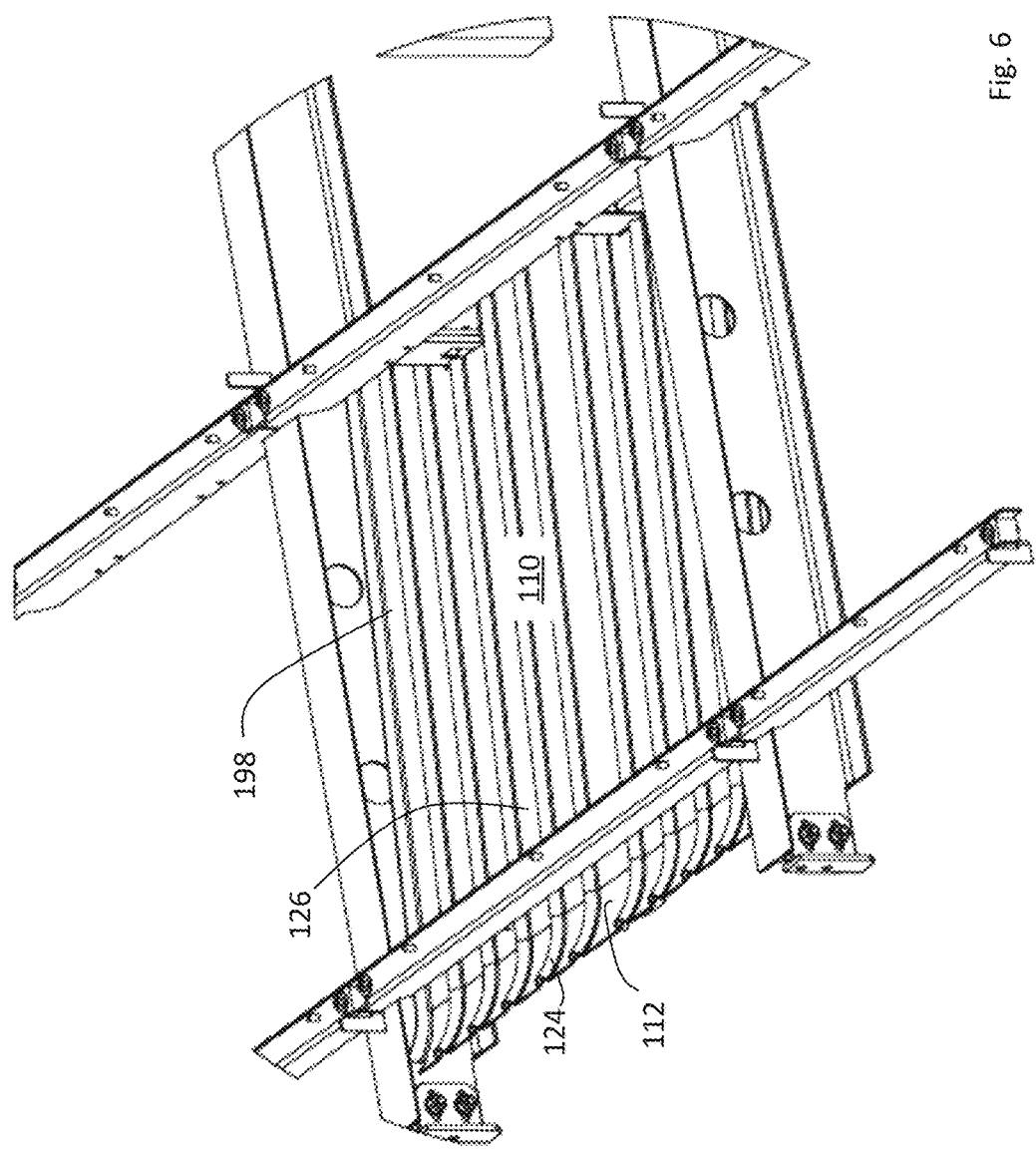

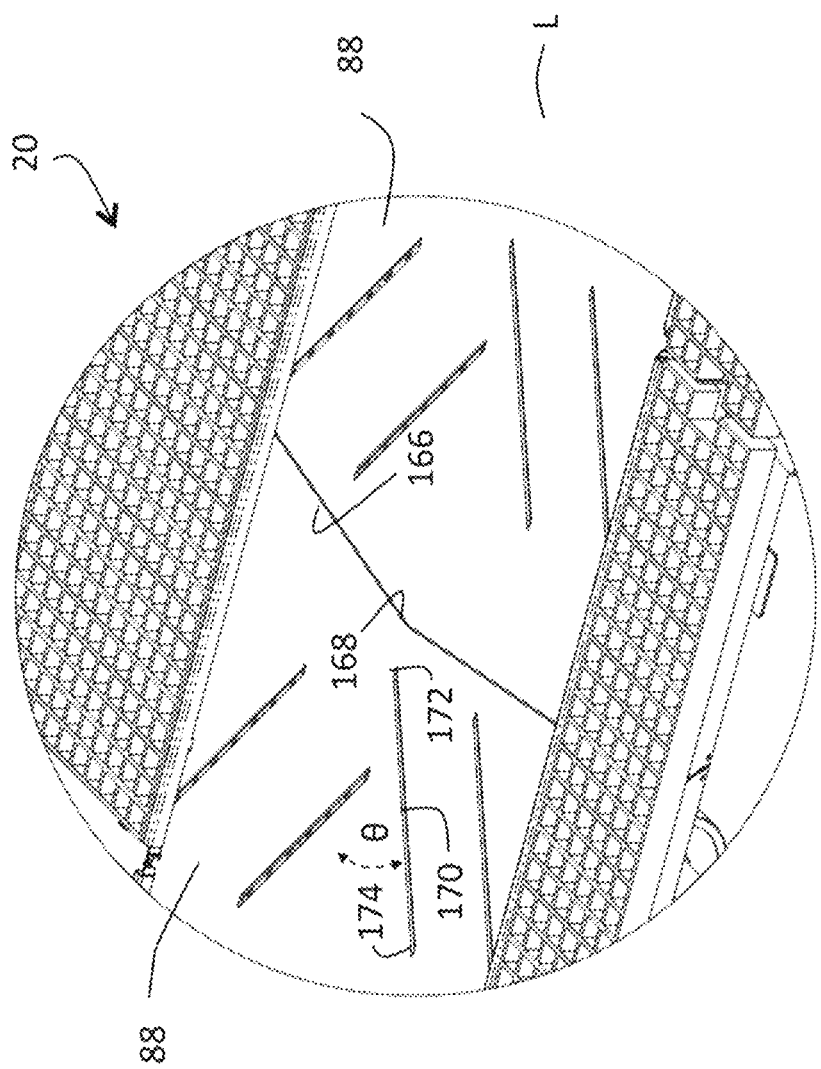

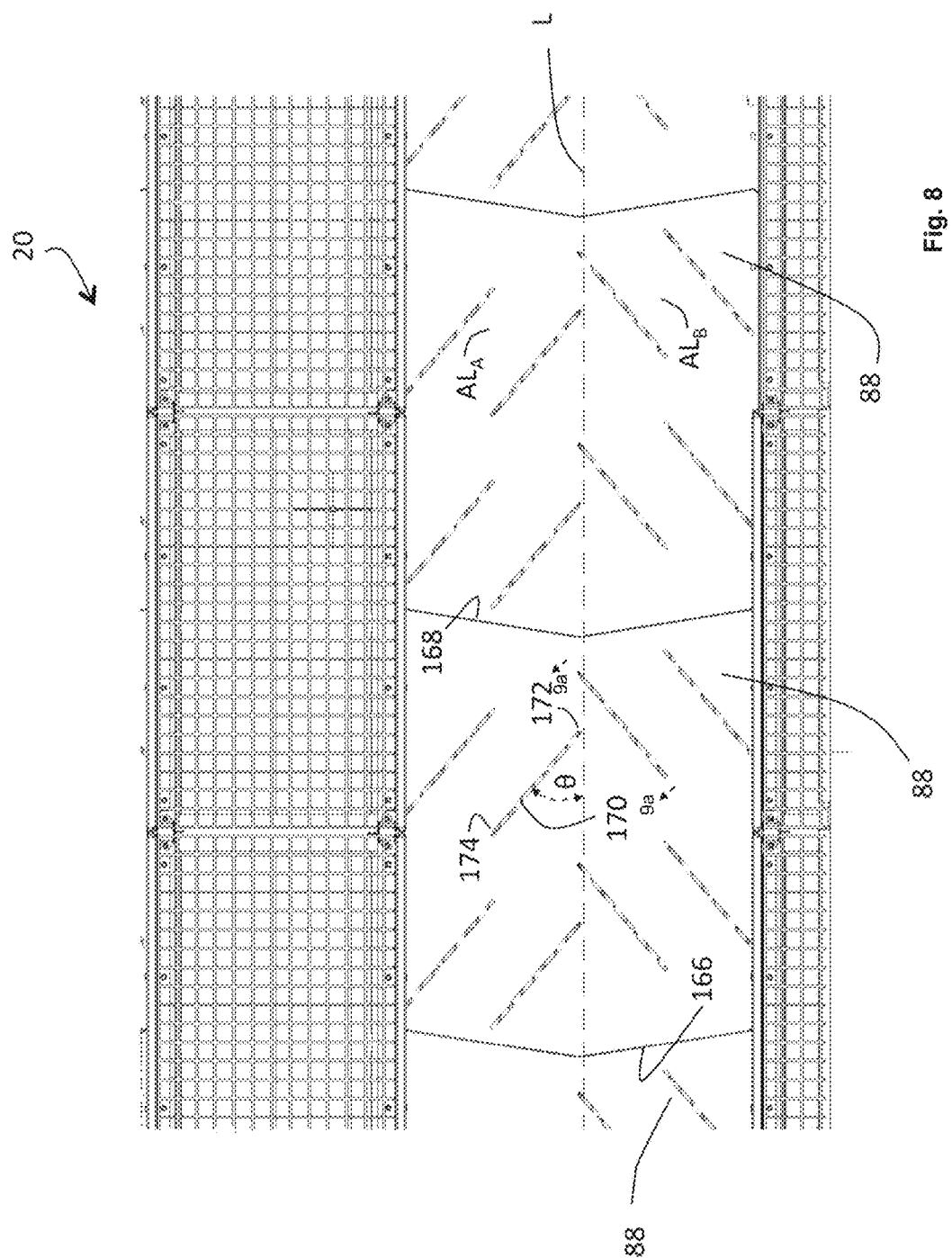

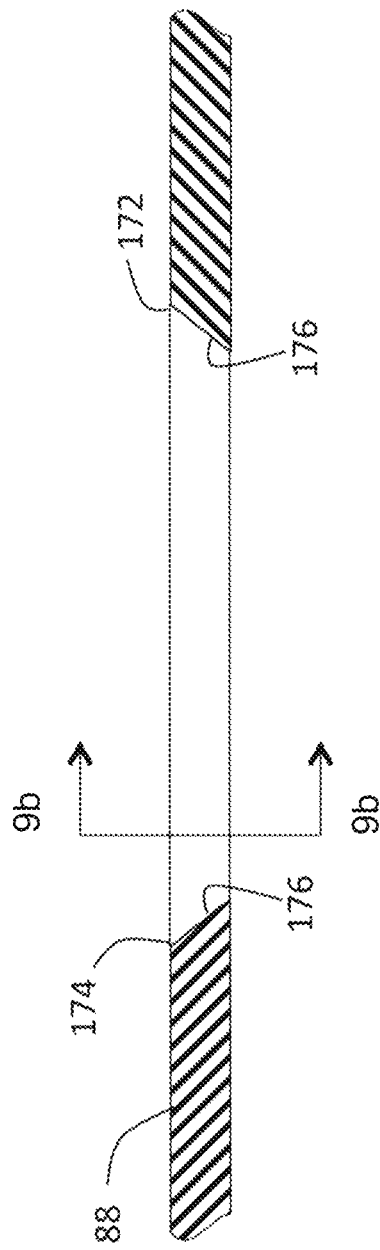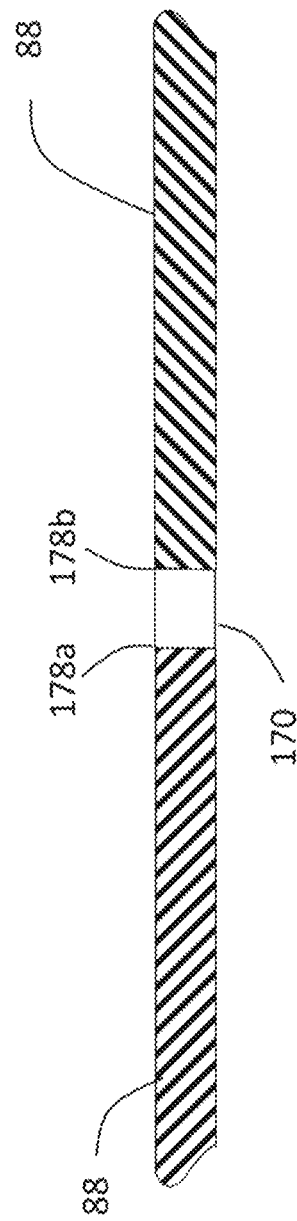
Fig. 9a
Fig. 9b

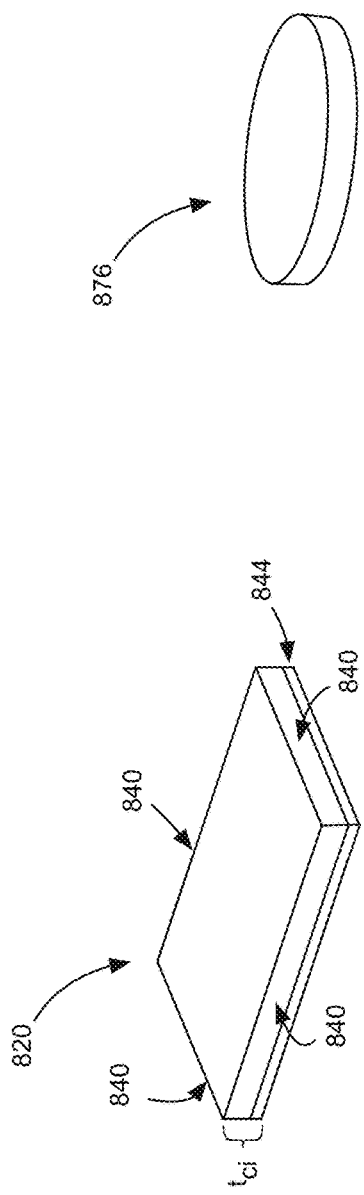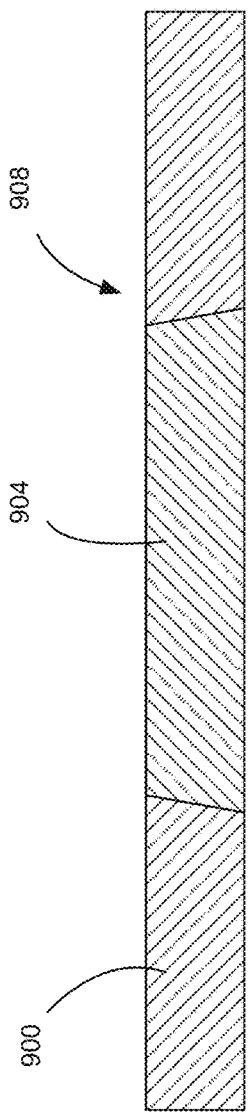

BELT CONTACT SURFACE WITH INSERTS, AND A CONVEYOR SYSTEM USING SAME

FIELD

The present disclosure relates to the field of conveyor systems, and in particular to a belt contact surface with inserts, and a conveyor system using same.

BACKGROUND OF THE DISCLOSURE

Conveyor systems have long been used to assist in the transport of materials from one location to another, in particular with respect to heavy and cumbersome items. The use of conveyor systems in assembly lines is well documented, with perhaps Henry Ford being the most famous proponent of the technology of the $20^{th}$ century.

Conveyors come in a variety of configurations, suiting a wide array of implementations. Belt conveyors in particular have been widely adopted due to their wide versatility and adaptability. For example, belt conveyors are commonly used in the warehousing, manufacturing, and mining sectors. More recently, belt conveyors have found application in the automotive industry, in particular with respect to automated car wash stations.

Some car washes employ single or synchronous dual belt conveyor systems for moving the vehicle through the wash tunnel. The belts are made from plastics and metals as these materials provide a relatively long life, and generally resist stretching and water corrosion.

The conveyor belts are supported by and travel across support decks that are conventionally made of a metal, such as steel or a steel alloy.

Over time, both the conveyor belts and the support decks wear mainly as a result of friction between the automotive vehicle-laden conveyor belts and the support decks. This wear is exacerbated by the presence of debris that is commonly removed from automotive vehicles and trapped between the conveyor belts and the support decks during the washing process. As the conveyor belts and the support decks wear, they can fatigue and/or rupture, requiring their replacement. The replacement of the conveyor belts can be particularly costly and labor-intensive.

SUMMARY OF THE DISCLOSURE

In one aspect, there is provided a conveyor system, comprising an endless belt mounted in a longitudinal direction through a service line, the endless belt having an upper transport portion adapted to move a wheeled structure through the service line, and a lower return portion, and a support deck positioned below the upper transport portion of the endless belt to support the endless belt, the support deck having a belt contact surface extending along a top of the support deck and in contact with the upper transport portion of the endless belt, the belt contact surface being at least partially constructed from a material that is at least partially a polymer, the belt contact surface having a set of inserts having a greater abrasion resistance than the material.

The belt contact surface can include a set of wear plates formed from the material. The material can be, for example, at least partially thermoplastic, polyethylene, ultra-high-molecular-weight polyethylene, or high-density polyethylene.

The conveyor system can further include a belt rinsing system including a rinsing system conduit arrangement connectable to a source of rinsing system liquid, and at least one belt rinsing arrangement, wherein each of the at least one belt rinsing arrangement includes a rinsing system dirt pass-through aperture in the support deck, over which the upper transport portion of the endless belt travels during operation, and at least one rinsing system outlet from the rinsing system conduit arrangement positioned proximate to the rinsing system dirt pass-through aperture and positioned to eject rinsing system liquid onto the endless belt upstream from a downstream edge of the rinsing system dirt pass-through aperture in order to capture at least some of the ejected liquid through the rinsing system dirt pass-through aperture.

Each of the set of wear plates can have openings in which the set of inserts are received. The inserts can have lateral sides, each of the lateral sides being oblique to a longitudinal direction of travel of the endless belt. Each of the set of inserts can have four lateral sides, each of the lateral sides forming an angle with the longitudinal direction of travel of the endless belt of between 40 degrees and 50 degrees.

Each of the set of wear plates can have a leading edge and a trailing edge dimensioned to mate with the leading edge of another of the set of wear plates, each of the leading edge and the trailing edge having oblique edge segments oblique to the longitudinal direction of travel of the endless belt and generally parallel to a closest one of the lateral sides of an adjacent one of the set of inserts.

The set of inserts can be configured in a central band extending along the longitudinal direction of travel of the endless belt, the central band extending laterally across between 30% and 80% of a lateral width of the set of wear plates.

The conveyor system can further comprise a belt rinsing system including a rinsing system conduit arrangement connectable to a source of rinsing system liquid, and at least one belt rinsing arrangement, wherein each of the at least one belt rinsing arrangement includes a rinsing system dirt pass-through aperture in the support deck positioned, over which the upper transport portion of the endless belt travels during operation, and at least one rinsing system outlet from the rinsing system conduit arrangement positioned proximate to the rinsing system dirt pass-through aperture and positioned to eject rinsing system liquid onto the endless belt upstream from a downstream edge of the rinsing system dirt pass-through aperture in order to capture at least some of the ejected liquid through the rinsing system dirt pass-through aperture.

The set of inserts can be configured in a central band extending along the longitudinal direction of travel of the endless belt, the central band extending laterally across between 30% and 80% of a lateral width of the set of wear plates.

The rinsing system dirt pass-through aperture can be spaced laterally from the central band.

The openings and the set of inserts can be designed so that the openings are at least partially unobstructed when the set of inserts are positioned therein, thereby defining the rinsing system dirt pass-through aperture.

The inserts and the openings can be dimensioned to inhibit upward escape of the inserts from the openings when the wear plates are positioned at the top of the support structure.

A compressible layer can be positioned under the inserts to facilitate depression of the set of inserts relative to the set of wear plates.

The conveyor system can have an endless belt mounted in a longitudinal direction through a service line, the endless belt having an upper transport portion adapted to move a wheeled structure through the service line, and a lower return portion, a support deck positioned below the upper transport portion of the endless belt to support the endless belt, the belt contact surface being dimensioned to extend along a top of the support deck and contact the upper transport portion of the endless belt, the belt contact surface being constructed from a material that is at least partially polymer, the belt contact surface being interspersed with inserts having a greater abrasion resistance than the material.

BRIEF DESCRIPTIONS OF THE DRAWINGS

For a better understanding of the various embodiments described herein and to show more clearly how they may be carried into effect, reference will now be made, by way of example only, to the accompanying drawings in which:

FIG. 2a is a partial side sectional view of the conveyor system according to the embodiment of FIG. 1;

FIG. 2b is a partial side sectional view of the conveyor system with reference to line 2b-2b of FIG. 2a;

FIG. 2c is a partial side sectional view of the conveyor system with reference to line 2c-2c of FIG. 2a;

FIG. 3a is a partial isometric view of the conveyor system according to the embodiment of FIG. 1, highlighting features of the conveyor frame;

FIG. 3b is a partial isometric view of the conveyor system with reference to line 3b-3b of FIG. 3a;

FIG. 4 is a partial transverse sectional view of the conveyor system according to FIG. 1, highlighting features in the region of the endless belt;

FIG. 6 is a partial isometric of the debris deflector according to the embodiment of FIG. 5;

FIG. 7 is a partial isometric view of the conveyor system according to FIG. 1, detailing features of the wear plates;

FIG. 8 is a partial plan view of the conveyor system according to FIG. 1, detailing features of the wear plates;

FIG. 9a is a sectional view of one of the wear plates with reference to line 9a-9a of FIG. 8, showing features of the debris slot;

FIG. 9b is a sectional view of one of the wear plates with reference to line 9b-9b of FIG. 9a, showing features of the debris slot;

FIG. 23 is a perspective view of one of the ceramic inserts of FIG. 22;

FIG. 27 is a perspective view of a round ceramic insert for use with wear plates similar to those of FIG. 22 in accordance with another embodiment;

FIG. 28 is a cross-sectional elevation view of a wear plate and ceramic inserts in accordance with a further embodiment;

DETAILED DESCRIPTION

Figure 1:
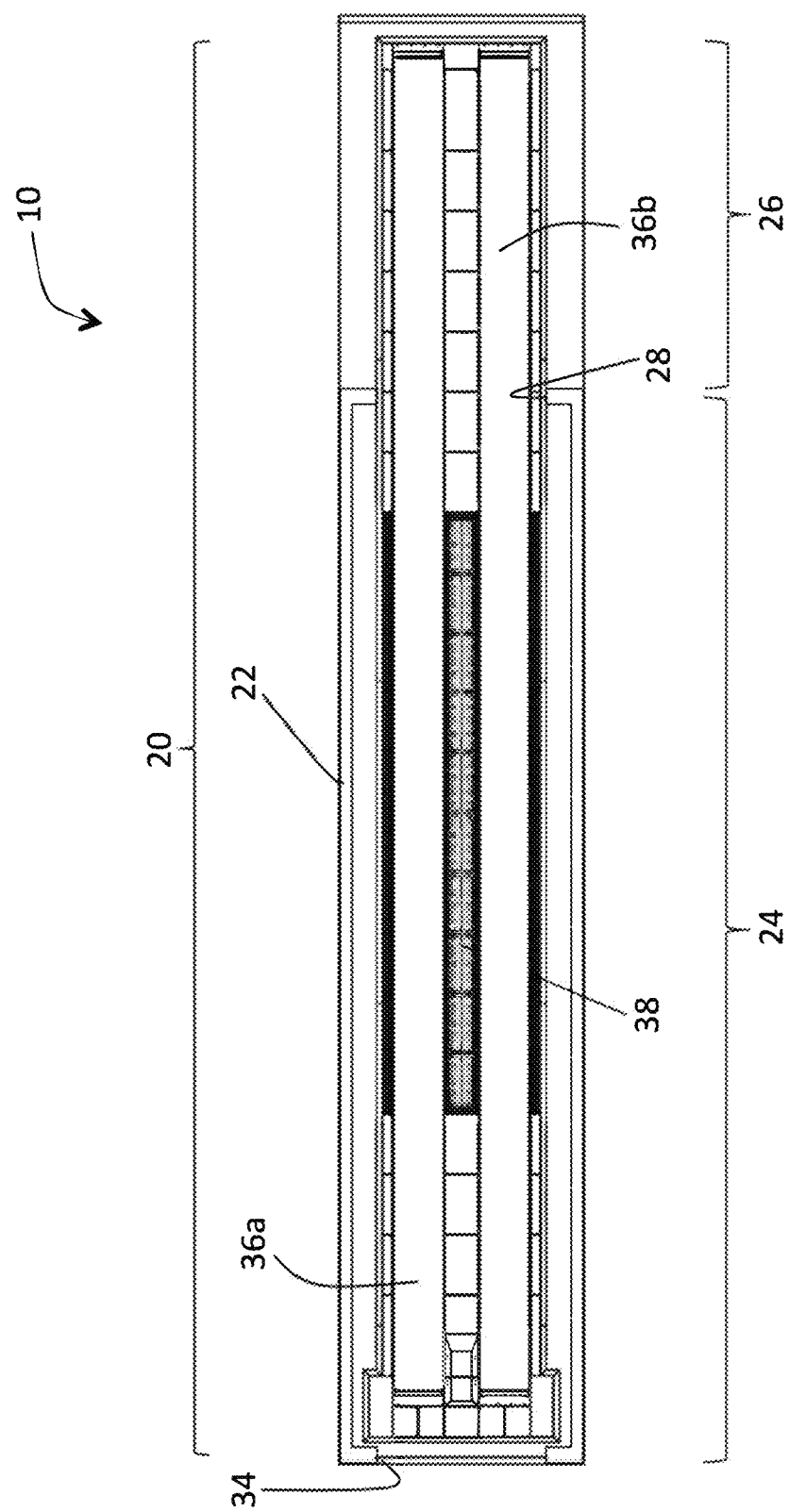
FIG. 1 is a plan view of the conveyor system according to an embodiment hereof.

For simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description.

The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field, background, brief summary, or the following detailed description.

Reference is made to FIG. 1, which shows a service line 10 having a conveyor system 20 for moving a wheeled structure 11, in accordance with an embodiment. As used herein, the term service line is not intended to be restrictive, and may encompass for example an automatic vehicle wash station (e.g., for cars, commercial trucks, etc.), a manufacturing or assembly line (e.g., for cars, trucks, non-powered mobile units, etc.) as well as a repair or detailing station (e.g., for cars, trucks, etc.). In addition, the term wheeled structure is not intended to be restrictive, and may encompass for example powered landborne vehicles (e.g., trucks, automobiles, tractors, recreational vehicles, etc.), non-powered landborne mobile units (e.g., recreational trailers, utility trailers, etc.), and airborne vehicles (e.g., airplanes, etc.).

The conveyor system 20 is adapted to transport a wheeled structure along a longitudinal length of the service line 10. As presented in FIG. 1, service line 10 is shown in the form of a car wash station having a wash tunnel 22. Accordingly, the conveyor system 20 includes a service zone 24 within the region of the wash tunnel 22 through which the vehicle is transported for a wash cycle. The conveyor system 20 also may also include a loading zone 26 adjacent a tunnel entrance 28, where vehicles align and initially load onto the conveyor system 20.

The conveyor system 20 is configured as a dual-belt system comprising a pair of endless belts mounted in a longitudinal direction through the service line 10. The endless belts 36a, 36b are positioned in parallel and spaced-apart relationship relative to one another through the loading and service zones 26, 24. In the region between the pair of endless belts 36a, 36b, there may be positioned a central stationary platform 38 of removable panels that permit access to regions under the pair of endless belts 36a, 36b, in particular for servicing and maintenance. It will be appreciated that where the conveyor system 20 is provided with two or more endless belts to transport the wheeled structure along the service line 10, the endless belts will move in synchronous motion. As the arrangement for each of the endless belts 36a, 36b is substantially identical, the endless belts 36a, 36b are herein collectively referred to as the endless belt 36 unless otherwise specified.

The endless belts 36a, 36b are made of a plurality of plastic belt segments that are hingedly coupled via pins that are typically made of metal or plastic. The plastic of the belt segments has a hardness HBs that enables the belt segments to withstand the load of a vehicle positioned thereon.

Turning now to FIGS. 2a, 2b and 2c, the conveyor system 20 is generally supported within a trench 40 having a depth suitable to house the required drive and guide mechanisms, and to permit maneuverability to service personnel. The endless belt 36 has an upper transport portion 42 and a lower return portion 44, and extends along the conveyor system 20 between a drive end 46 and an idler end 48. The drive end 46 and idler end 48 provide axially elongated rollers 50 and 52, respectively, which are rotatably supported on a conveyor frame 54, to guide the endless belt 36 around the respective drive and idler ends 46 and 48.

The drive end 46 includes a drive module 56 adapted to engage and move the endless belt around the drive and idler ends 46 and 48. The drive module 56 may be an electric motor as shown, and may include at least one drive member 58 to engage the endless belt 36 and move it around the respective drive and idler ends 46 and 48. As shown, the drive member 58 is provided in the form of at least one sprocket 60 provided with sprocket teeth 62 to engage complementary tracks (not shown) on the inward surface 64 of the endless belt 36. The conveyor system 20 will additionally include guide members 66 supported upon the conveyor frame 54 to support the lower return portion 44 of the endless belt 36 as it moves back towards the idler end 48 on the underside of the conveyor system 20. As shown, the guide members 66 are provided in the form of rollers.

In motion, the upper transport portion 42 of the endless belt 36 moves in tension from the idler end 48 towards the drive end 46 by drive member 58, while the lower return portion 44 moves in a slackened state from the drive end 46 towards the idler end 48.

Turning now to FIGS. 3a and 3b, shown is an enlarged view of the conveyor system 20 with the endless belt 36 and associated support structure removed to highlight features of the conveyor frame 54. The conveyor frame 54 includes a plurality of cross-members 68 positioned transversely relative to the longitudinal direction of the service line 10. The cross-members 68 are dimensioned to span the width of the trench 40, and are adapted to mount on opposing surfaces 70 and 72. Each cross-member 68 also provides at least one footing 74 at approximately a midpoint thereof, extending to a floor 76 of the trench 40 to provide additional load-bearing performance to the conveyor frame 54.

Arranged in the longitudinal direction, the conveyor frame 54 additionally provides a plurality of support rails that extend the longitudinal length of the service line 10, from the idler end 48 to the drive end 46. The support rails are arranged as two inner support rails 78a, 78b and two outer support rails 80a, 80b. The inner support rails 78a, 78b are generally positioned symmetrically about the longitudinal centerline of the service line 10, while the two outer support rails 80a, 80b are situated proximal to the longitudinal walls of the trench 40. The inner support rails 78a, 78b and the outer support rails 80a, 80b may be fixedly attached in place by rivets, threaded fasteners (e.g., bolts), metallurgic bonding (e.g., welded attachment), or any other suitable means to achieve a secure attachment.

Having reference to FIG. 4, the inner support rails 78a, 78b cooperatively define a gap spacing for the central stationary platform 38 provided between the endless belts 36a, 36b. The inner support rails 78a, 78b each provide a respective seat 82a, 82b configured to receive and support the central stationary platform 38. In the embodiment shown, the central stationary platform 38 is provided in the form of fiberglass or thermoplastic grating. In addition, for each endless belt 36, the respective opposing inner and outer rails 78a, 80a define a gap spacing to receive a support deck 84. The support deck 84 generally includes a plurality of modular grid panels 86 adapted to be positioned end to end relative to one another along the longitudinal length of the service line 10. The modular grid panels are provided with a length that aligns the point of contact between adjacent grid panels on a transverse cross-member 68, providing weight-bearing support thereto. The support deck 84 is positioned between the upper transport portion 42 and lower return portion 44 of the endless belt 36, generally in close proximity to the upper transport portion 42. In this way, the support deck 84 provides support to the upper transport portion 42 of the endless belt 36, and thereby a load placed thereon from a wheeled structure placed upon the conveyor system 20. To facilitate sliding of the endless belt over the support deck 84, a belt contact surface in the form of a plurality of wear plates 88 is provided between the upper transport portion 42 and the support deck 84. The belt contact surface is the portion of the support deck 84 facing the endless belt 36 during normal use. The belt contact surface can have a thickness so that, as it wears through use with the endless belt 36, it continues to facilitate sliding of the endless belt 36 thereover until the belt contact surface is worn out.

The wear plates 88 form a structure that extends along a top of the support deck 84 and contacts the upper transport portion 42 of the endless belt 36. The arrangement of the inner and outer support rails 78a, 78b, 80a, 80b may additionally be used to mount the guide member 66 supporting the lower return portion 44 of the endless belt 36. As shown, the inner and outer support rails 78a, 80a provide respective guide hangers 90, 92 that support the guide member 66 in a transverse direction relative to the longitudinal direction of the service line 10. As shown, the guide member 66 is provided with a plurality of rollers 94 that support an outward surface 96 of the endless belt 36 along the lower return portion 44.

Continuing with FIG. 4, also provided between the upper transport portion 42 and the lower return portion 44 of the endless belt 36, and in particular between the support deck 84 and the lower return portion 44 is a debris deflector 98. The debris deflector 98 provides a barrier to protect the lower return portion 44 from debris falling from the support deck 84, in particular where the support deck 84 is provided in the form of the modular grid panels. The debris deflector 98 is generally mounted on an angle directed downwardly towards the longitudinal centerline of the service line. The debris deflector 98 may be mounted on dedicated brackets, or may be mounted on the guide hangers 90 and 92 used for supporting the guide members 66 (as shown). The debris deflector 98 is generally configured to provide a contiguous barrier between adjacent cross-members, so as to maximize the protection from falling debris. In some embodiments, the debris deflector 98 may be provided in the form of multiple panels arranged and fastened in side-by-side relationship to one another.

It will be recognized that the arrangement of the support deck 84, the debris deflector 98 and the longitudinally-spaced cross-members 68 define a partial enclosure in the region between the upper transport portion 42 and the lower return portion 44 of the endless belt 36. To assist in reducing the likelihood of freezing conditions on the conveyor system 10, in particular sections exposed to the outside environment, such as the loading zone 26 shown in FIG. 1, at least a portion of the conveyor system 20 may include a heater in these partial enclosures between adjacent cross-members 68. Referring to FIGS. 3 and 4, the conveyor system 20 provides a heater 100 positioned between the support deck 84 and the debris deflector 98, extending in the longitudinal direction across one or more of the partial enclosures delimited longitudinally between adjacent cross members 68. Accordingly, the partial enclosures containing the heater 100 provide a region of higher heat concentration relative to other areas within the trench 40, in particular the area below the debris deflector 98. In this way, the support deck 84, the endless belt 36 supported thereon, and the plurality of wear plates 88 positioned therebetween receive heat from the region of higher heat concentration, thereby reducing the likelihood of a freeze event in the conveyor system 20. It will be appreciated that freeze events in conveyor systems can result in extensive damage to the endless belt 36 and/or drive module 56.

To enable passage of the heater 100 between adjacent partial enclosures separated by the cross-members 68, the cross-members 68 are adapted with one or more pass-through apertures 102, depending on whether the heater is adapted to pass once through the desired heated portion, or in a serpentine path therethrough. In the embodiment shown in FIG. 4, two pass-through apertures are provided for each side of the conveyor system 20.

It will be appreciated that the heater 100 may take on a variety of forms. For example, the heater 100 may be configured as a convective heater, such as a convective tube heater including both smooth and finned-tube varieties. A convective tube heater will generally be part of a fluid circuit having an electric or gas-fired heater module to deliver a heated fluid therein. The heater 100 may also be configured as a radiant heater such as a gas-fired radiant tube heater, or a resistive electrical heating element.

The debris deflector 98 may be formed from any suitable material including but not limited to metal (e.g., stainless steel, galvanized steel, aluminum, etc.), thermoplastics (e.g., polypropylene, polyethylene, etc.) and composites. To promote direction of the emitted heat from heater 100 towards the support deck 84, the debris deflector 98 may be adapted with at least a selected level of thermal reflectivity. The thermal reflectivity may be achieved by constructing the debris deflector 98 in the form of a radiant barrier. Alternatively, a radiant barrier may be separately formed and applied to the debris deflector 98, for example in the form of a thin radiant barrier sheet attached thereto. Radiant barriers are typically highly reflective materials (e.g., aluminum or polished stainless steel foil) applied to a substrate. Exemplary substrates may include kraft paper, oriented strand board, plastic films and plywood. For environments that experience high moisture levels, for example a car wash tunnel, the substrate may be of metal or thermoplastic construction. Exemplary thermoplastic substrates may include polypropylene or polyethylene foam core. In general, the material applied to the substrate should exhibit an emittance of less than 0.25, as measured by ASTM C1371. In addition to polished metallic films, low-emittance coatings such as metal oxide may be used on a suitable substrate. It will be appreciated that the side of the debris deflector 98, or separately formed sheet, facing the support deck 84 is the side adapted to receive the highly reflective material. In other words, the highly reflective material, and thus the effective side of the radiant barrier is intended to face the region of higher heat concentration between the debris deflector 98 and the support deck 84.

Figure 5:
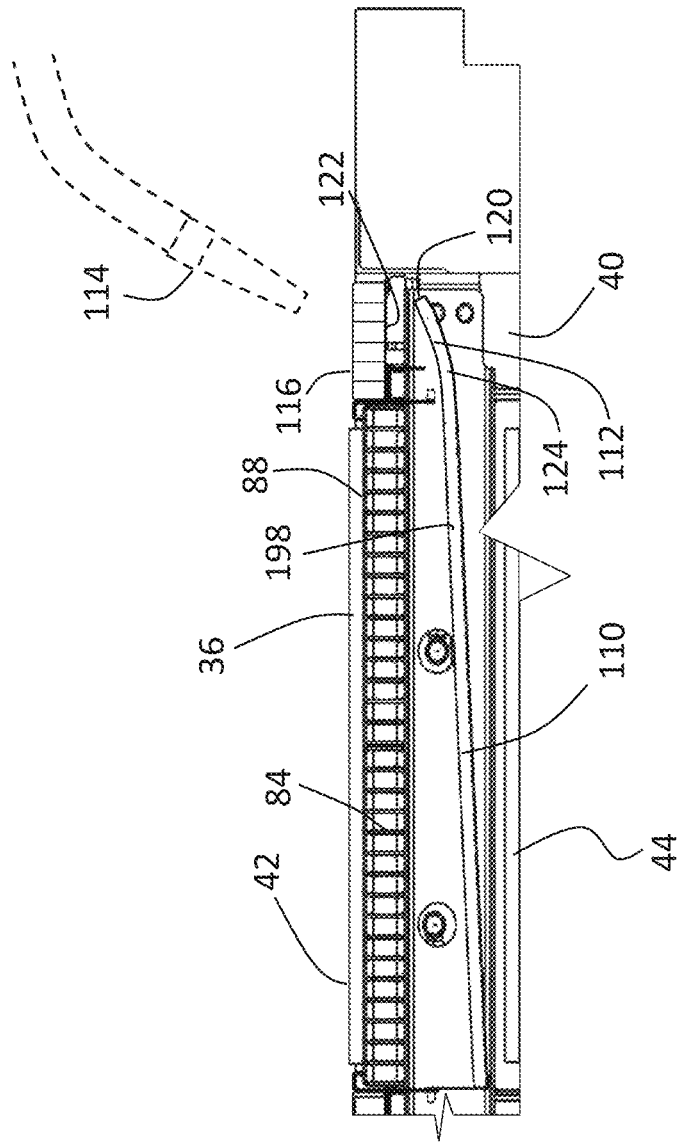
FIG. 5 is a partial transverse section view of the conveyor system according to FIG. 1, showing an alternative embodiment of the debris deflector.

Having regard to FIGS. 5 and 6, shown is a debris deflector 198 according an alternative embodiment. As the debris deflector 198 is arranged in the conveyor system 20 in substantially the same way as debris deflector 98, only the differences associated with this alternative embodiment are discussed. The debris deflector 198 includes a debris portion 110 that is positioned under the support deck 84, and a water collection portion 112 that extends outwardly therefrom, towards a respective side wall of the trench 40. The water collection portion 112 is intended to facilitate cleaning of the debris portion 110 of the debris deflector 198, without the need for substantial disassembly and associated downtime of the conveyor system. With this arrangement, a sprayer or suitable wash nozzle 114 may be positioned as shown to deliver a stream of water directly upon the water collection portion 112 of the debris deflector 198, promoting a wash effect to remove accumulated debris from the debris portion 110. Access to the water collection portion 112 may be achieved by removing side panels 116, or where the side panels 116 are provided in the form of fiberglass or thermoplastic grating, wash water may be delivered directly therethrough. The use of grates for the side panels 116 will also permit a greater volume of wash and rinse water from the wash tunnel to be captured by the water collection portion 112, enhancing the cleaning effect of the debris deflector 198 during normal wash tunnel usage.

As shown, the water collection portion 112 of the debris deflector 198 is generally arranged at an angle relative to the debris portion 110, with its terminal lateral edge 120 being positioned proximal the underside 122 of the side panel 116. The debris deflector 198 is provided with a curved transition 124 between the water collection portion 112 and the debris portion 110 to deflect the impingement of rinse water, with reduced turbulence, therein resulting in an effective flushing of debris from the debris portion 110 of the debris deflector 198.

The debris deflector 98, 198 may be formed of stamped or formed stainless steel, or galvanized steel to provide a rust-inhibiting effect. In an alternative embodiment, the debris deflectors 98, 198 may be formed of a thermoplastic material, for example a polyolefin, a low or high-density polyethylene, polyvinyl chloride, or an acrylonitrile butadiene styrene (ABS), and may include suitable fillers or additives to achieve the desired performance characteristics. In general, suitable materials will exhibit resistance to wear, corrosion and pitting, as well as low moisture absorption and low reactivity to chemicals. Suitable materials should also exhibit a general non-stick behavior (i.e., as achieved through improved surface smoothness and a low coefficient of friction) in relation to oil and grease, as well as dirt and salt. In one embodiment, the debris deflector 98, 198 may be formed of polypropylene or polyethylene, and may include glass fibers to improve impact performance at low temperature.

When formed of thermoplastic material, the debris deflector 98, 198 may be formed via any suitable molding process, including but not limited to vacuum forming, compression molding and thermoforming. When molded, a thermoplastic debris deflector may incorporate one or more structural ribs 126 (as seen in FIG. 6). The structural ribs 126 provide additional rigidity to the debris deflector 98, 198, and establish sluice-like channel-ways 128 that direct water flow, enhancing the wash effect.

As stated earlier, and having regard to FIG. 2a, the upper transport portion 42 of the endless belt 36 moves in tension from the idler end 48 towards the drive end 46 by drive member 56, while the lower return portion 44 moves in a slackened state from the drive end 46 towards the idler end 48. In the slackened state, the lower return portion 44 of the endless belt 36 may be subject to greater lateral movement, having the potential to create belt tracking and alignment issues. This is particularly evident at the idler end 48 where the axially elongated roller 52 is not provided with engagement teeth as found on the opposing drive member 58 at the drive end 46. Misalignment and poor tracking of the endless belt 36 can cause excessive wear on the conveyor mechanism, necessitating increased maintenance and associated downtime. Issues of misalignment of the endless belt 36 can increase upon aging of the endless belt 36, generally due to belt stretch. Accordingly, in an alternative embodiment, a least one pair of lateral guide rollers are incorporated into the conveyor system 20.

The wear plates 88 are made from a material that is at least partially thermoplastic, and, in particular, at least partially polyethylene, such as an ultra-high-molecular-weight polyethylene ("UHMWPE"), which is also known as high-modulus polyethylene ("HMPE"). UHMWPE is a thermoplastic polyethylene that has extremely long chains. The longer chains serve to transfer load more effectively to the polymer framework by reinforcing intermolecular interactions. Further, UHMWPE has low moisture absorption, a very low coefficient of friction, a high strength, and is highly resistant to abrasion as a result of the longer chains, especially in comparison to carbon steel. Further, UHMWPE is very resistant to corrosion. Some particular exemplary materials that can be used to manufacture the wear plates are virgin UHMWPE such as available from Rochling Engineering Plastics and the Garland Manufacturing Company, reprocessed UHMWPE such as available from Rochling Engineering Plastics, glass filled UHMWPE such as available from Quadrant Plastic Composites Inc., ceramic filled UHMWPE such as available from Polymer Industries Inc. and Quadrant Plastic Composites Inc., and cross-linked UHMWPE such as available from Rochling Engineering Plastics and Polymer Industries Inc.

Alternatively, in other embodiments, the wear plates can be made from a material that is at least partially high-density polyethylene ("HDPE"). HDPE is also suitable for use for construction of the wear plates 88. In another embodiment, a proprietary polyethylene, Polystone™ sold by Rochling Engineering Plastics, can be used to manufacture the wear plates.

The material of the wear plates 88 can be selected it has a hardness Hwp that is lesser than the hardness HBs of the plastic belt segments in some scenarios.

The costs for the manufacturing of wear plates form these materials ranges from 63% to over 200% of the price using stainless steel in some cases, based on the current prices of stainless steel and these thermoplastics. Depending on the material selected and application, suitable thickness ranges are in the 3/16 inch to 3/8 inch range (5-10 mm) in some scenarios.

Traditionally, the use of such materials for belt contact surfaces was deemed unsuitable as dirt trapped between the endless belts and the belt contact surfaces caused the belt contact surfaces to wear at an unsatisfactory rate without significant improvements to the wear of the endless belts. Wearing of the endless belts and the belt contact surface occurs in the form of erosion. As the endless belts are worn down, the pins holding belt segments together are exposed and can be deformed and pop out, allowing the belt segments to separate. Erosion of the belt contact surface can accelerate endless belt wear where the endless belt is in contact with the underlying structures.

It has been found that, by using a belt rinsing system that introduces and drains a rinsing fluid between the endless belts and the belt contact surfaces, the dirt trapped between the endless belts and the belt contact surfaces can be reduced and that the wear rate of both the endless belts and the belt contact surfaces can be reduced.

That is, by making the belt contact surface (i.e., the wear plates 88) from a softer material than stainless steel that is traditionally used, and by rinsing away debris from the interface between the endless belts 36a, 36b and the support deck, the lifetime of the endless belts 36a, 36b can be increased as a result of the lower wear from contact with the wear plates 88.

Certain thermoplastics, such as UHMWPE and HDPE have been found to be suitable due to their possession of certain characteristics. These materials provide a sufficiently low coefficient of friction, and are sufficiently resistant to abrasion. The wear plates 88 are inexpensive to replace relative to the replacement cost of the endless belts 36a, 36b. The replacement cost of an endless belt 36a, 36b can be high as there is a significant amount of manual labor in disassembling the belt segments to be replaced. Wear plates made from a material that is substantially UHMW have been found to have a service lifetime that ranges from 11% to 200% of the durability of wear plates made from stainless steel. Of more interest is that, due to the relative softness, higher resistance to abrasion, and lower coefficient of friction of the material compared to stainless steel traditionally employed in these applications, the wear rate of the endless belts is reduced, thus extending their service lifetime significantly, anywhere from 50% to 1700% in some cases.

Another characteristic of thermoplastics is that they generally have a hardness Hwp that is lesser than the hardness HBs of the belt segments of the endless belts 36a, 36b. As a result, the wear plates 88 are designed to improve the lifetime of the endless belt 36 by sacrificing the lifetime of the wear plates 88.

Polyethylenes and other thermoplastics are subject to thermal expansion and contraction. In the car wash environment, the range of temperatures that the wear plates 88 are subject to is significant. The wear plates 88 have a longitudinal length of approximately 44 inches and have been found to expand and contract +/−0.2 inches over a typical operational ambient temperature range. In order to compensate for these expansions and contractions, expansion gaps between the leading and trailing edges 166 and 168 of the wear plates 88 of 0.2 inches or greater are provided.

Each wear plate 88 is provided with a plurality of debris slots 170 that permit the evacuation of debris therethrough, so as to reduce the accumulation of debris between the endless belt and the wear plates 88. Each debris slot 170 includes a first slot end 172 and a second slot end 174, and is provided with a width of 10 mm, although widths of between 8 to 25 mm may be implemented. Each debris slot 170 may be linear (i.e., straight) and may be arranged at an angle θ relative a longitudinal centerline L of the wear plate 88. As shown, the debris slot 170 is outwardly angled from the longitudinal centerline L in the direction of the first slot end 172 towards the second slot end 174. The angle θ of each debris slot 170 is 35° relative to the longitudinal centerline L of the wear plate 88, although angles between 25° to 45° may be implemented. In general, angle selection is based on observed belt wear. It has been determined that angles within this range, and in particular at 35° relative to the longitudinal centerline L of the wear plate 88 result in the least amount of endless belt wear during use, therein increasing the usable lifespan of the endless belt and wear plates.

The first slot end 172 and the second slot end 174 of each debris slot 170 can be provided with an inwardly sloped bevel 176, as shown in FIG. 9a. It has been determined that maximum wear of the endless belt occurs where the endless belt passes over a sharp edge perpendicular to the direction of belt travel. Accordingly, with the first and second slot ends 172 and 174 having the inwardly sloped bevel 176, in particular at the second slot end 174, the extent of belt wear is reduced, particularly when the wear plates are constructed of stainless steel. Between the first and second slot ends 172 and 174 of the debris slot 170, the opposing edges 178a and 178b remain unbeveled, that is they remain as sharp edges, as shown in FIG. 9b. As the endless belt is passing over these sections of the debris slot 170 at an angle (i.e., 35° relative to the longitudinal centerline L of the wear plate 88), the extent of belt wear is minimal. Moreover, by maintaining these edges sharp as shown, they provide a stripping action to remove debris from the underside of the endless belt, without excessive wear thereto.

It will be appreciated that while both the first and second slot ends 172 and 174 are shown as being beveled, in some embodiments, only one of the first and second slot ends 172 and 174 is beveled. In an alternative embodiment, only the second slot end 174 is beveled.

By using certain thermoplastics that are softer than stainless steel, have a low coefficient of friction, and/or a high resistance to abrasion in constructing the wear plates, it has been found that the beveling of the debris slots 170 as shown in FIGS. 9a and 9b can be omitted without materially increasing wear on the endless belt 36. The beveling of the debris slots 170 adds to the manufacturing costs of the wear plates 88 and, thus, the ability to omit this feature without materially impacting the lifetime of the endless belt 36 is another benefit to the use of thermoplastics in the construction of the wear plates 88.

In the embodiment shown in FIG. 8, each wear plate 88 provides 8 debris slots 170, generally presented in two rows of 4 arranged across the wear plate 88. Within each row, the 4 debris slots are arranged in two paired sets of debris slots, with the two paired sets of debris slots being longitudinally offset relative to one another. The arrangement of the debris slots 170 is such that the leading and trailing ends 172 and 174 of successive debris slots 170 align, so as to reduce the number of locations having increased potential for belt wear. As shown, alignment between successive debris slots occurs along longitudinal centerline L, as well as alignment line ALA and alignment line ALB.

It will be appreciated that while each wear plate 88 is shown as having 8 debris slots 170, in other embodiments, the number of debris slots 170 may be fewer or greater, depending on the extend of debris removal required. While the leading and trailing ends 172 and 174 of all debris slots 170 may be machined with the aforementioned inwardly sloped bevel, in some embodiments, only the debris slots 170 arranged proximal the longitudinal centerline L of the wear plate 88 may be beveled. In other preferred embodiments, the debris slots 170 are not beveled.

Figure 10A:
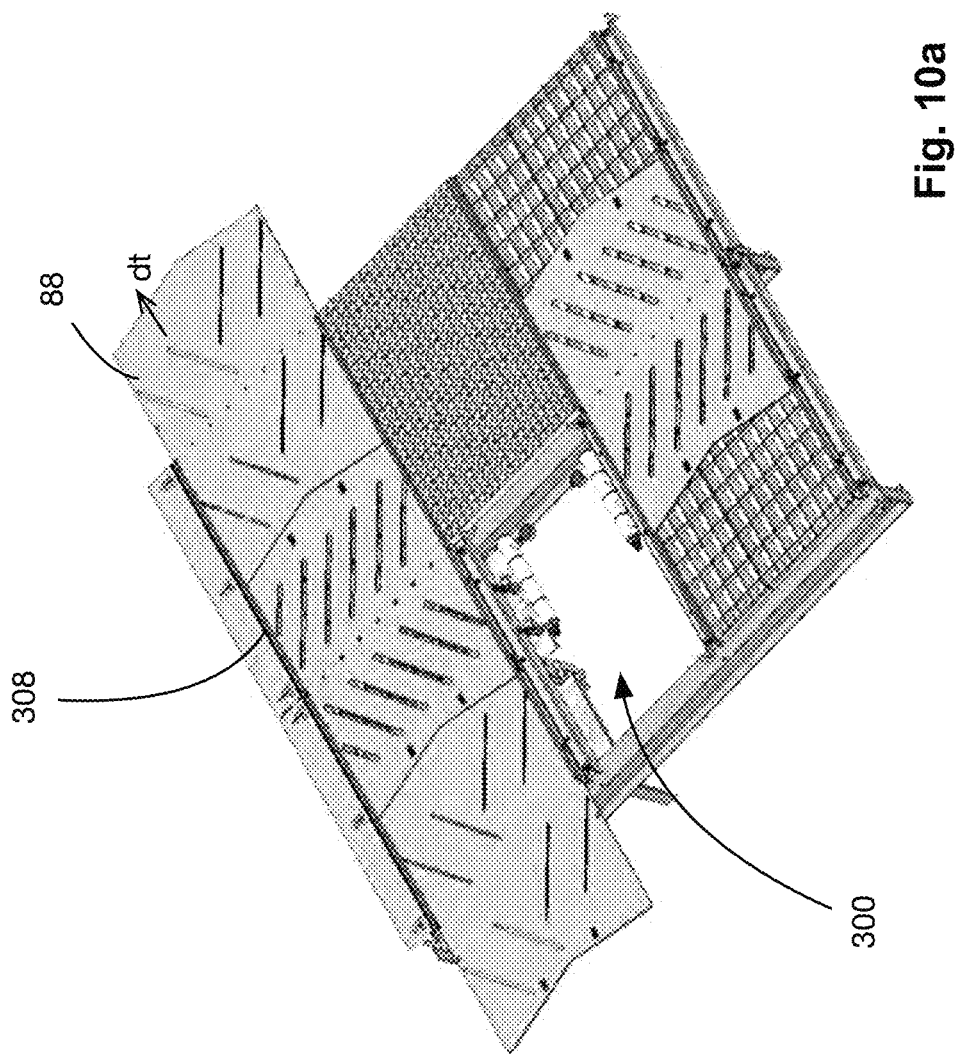
FIGS. 10a-13 show a rinsing system for the conveyor system.
Figure 10B:
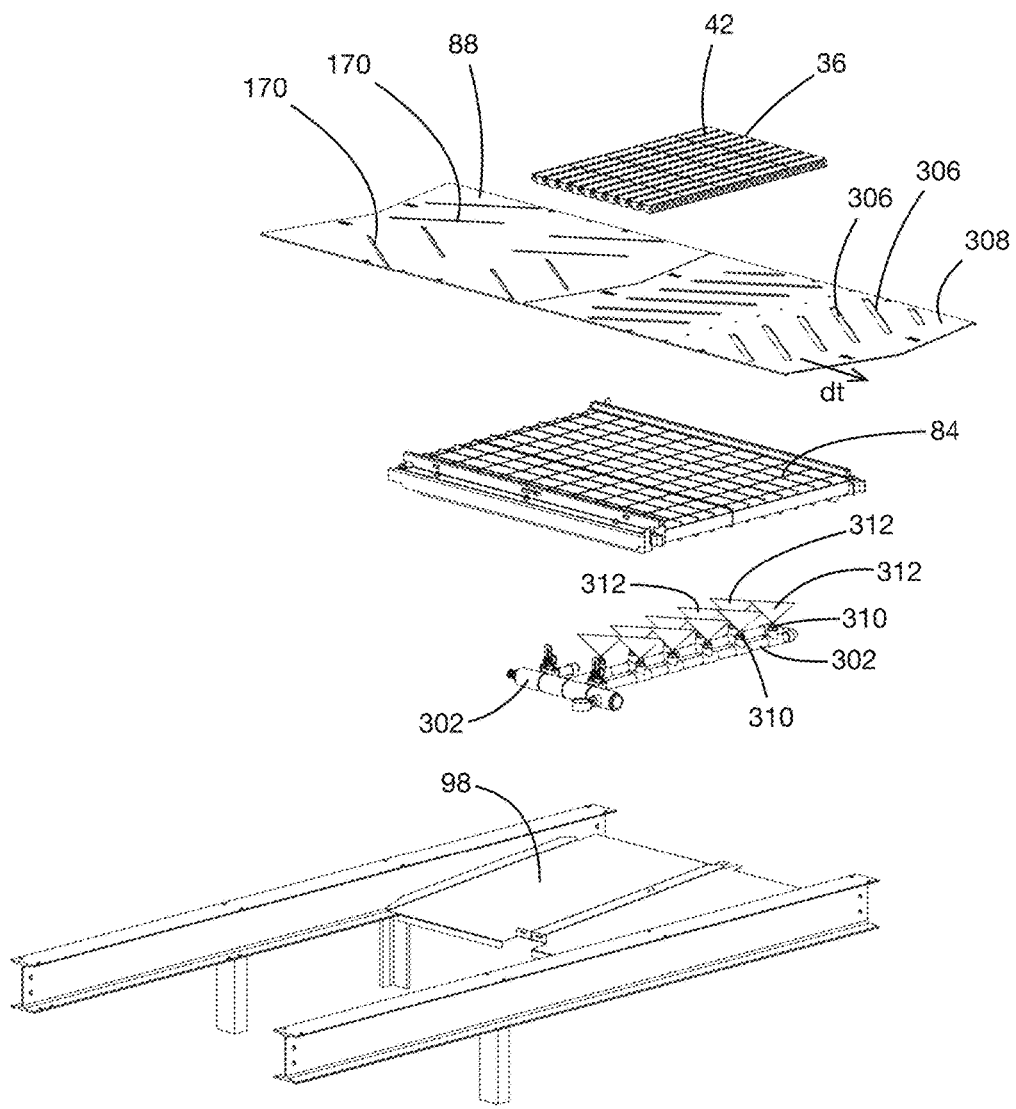

Reference is made to FIGS. 10a-13, which shows the conveyor system 20 with an optional rinsing system 300. The rinsing system 300 includes a rinsing system conduit arrangement 302 (a portion of which is shown in FIGS. 10a and 10b), which is connectable to a source of rinsing system liquid (e.g., a city water supply). The rinsing system 300 further includes at least one belt rinsing arrangement 304. In the present example, the rinsing system 300 includes a plurality of belt rinsing arrangements 304 spaced longitudinally apart for rinsing the upper transport portion 42 of the endless belt 36.

Each belt rinsing arrangement 304 includes a rinsing system dirt pass-through aperture 306 in the support deck 84, over which the upper transport portion 42 of the endless belt 36 travels during operation. As can be seen, in the embodiment shown in FIG. 10a, the rinsing system dirt pass-through aperture 306 is provided in a rinsing system wear plate 308. The rinsing system dirt pass-through aperture 306 may be similar to the debris slots 170 in the wear plates 88, but may be wider in the direction of travel (shown at Dt) of the endless belt 36 for reasons provided below.

Each belt rinsing arrangement 304 further includes at least one rinsing system outlet 310 from the rinsing system conduit arrangement 302 positioned proximate to the rinsing system dirt pass-through aperture 306a and positioned to eject rinsing system liquid (shown at 312 in FIGS. 11 and 12) onto the endless belt 36 upstream from a downstream edge 314 of the rinsing system dirt pass-through aperture 306a in order to capture at least some of the ejected liquid 312 through the rinsing system dirt pass-through aperture 306a. The terms 'upstream' and 'downstream' are both in relation to the direction of travel Dt of the upper transport portion 42 of the endless belt 36. The upstream edge of the rinsing system dirt pass-through aperture 306a is shown at 315. Additional rinsing system dirt pass-through apertures 306b enables the flushing of ejected liquid 312 downstream of the rinsing system dirt pass-through apertures 306a.

Put another way, the rinsing system 70 can rinse off dirt from the endless belt 36 so as to prevent that dirt from causing wear on the belt 36 as the belt 36 moves along during operation. The dirt may be present directly at the sliding interface between the belt 36 and the wear plates 88 and 308. Additionally, the dirt may be present at the pins (shown at 316) that pivotally connect belt segments (shown at 318) that make up the belt 36.

Pockets (shown at 320) are present in the endless belt 36 and some portions of the pins 316 are exposed in the pockets 320. It is therefore beneficial for the rinsing system 300 to be able to eject rinsing system liquid into the pockets 320 to rinse dirt from the pins 316. This inhibits dirt from migrating into the interface between the pins 316 and the associated surfaces of the belt segments 318, which reduces the wear that can occur on the belt segments 318 at that interface. Such wear contributes to ovalizing of the apertures in the belt segments 318 in which the pins 316 reside, causing the belt 36 to lengthen and contributing to accelerated wear and failure of the belt 36.

Thus it may be said that the endless belt includes a plurality of belt segments 318 that are pivotally connected to one another via at least one pin 316 that extends laterally. The endless belt 36 includes at least one pocket 320 that exposes the at least one pin 316. The at least one rinsing system outlet 310 is positioned to eject rinsing system liquid into the at least one pocket 320 onto the at least one pin 316 to remove dirt from the at least one pin 316.

The rinsing system outlet 310 may be any suitable type of outlet that is capable of ejecting rinsing system liquid the distance needed to remove dirt from the endless belt 36. In some examples, the pressure of the rinsing system liquid at the rinsing system outlet 310 may be about 20 psi or higher. In some examples, it may be 40 psi or higher. The rinsing system outlet 310 may, for example, be a nozzle.

Figure 13:
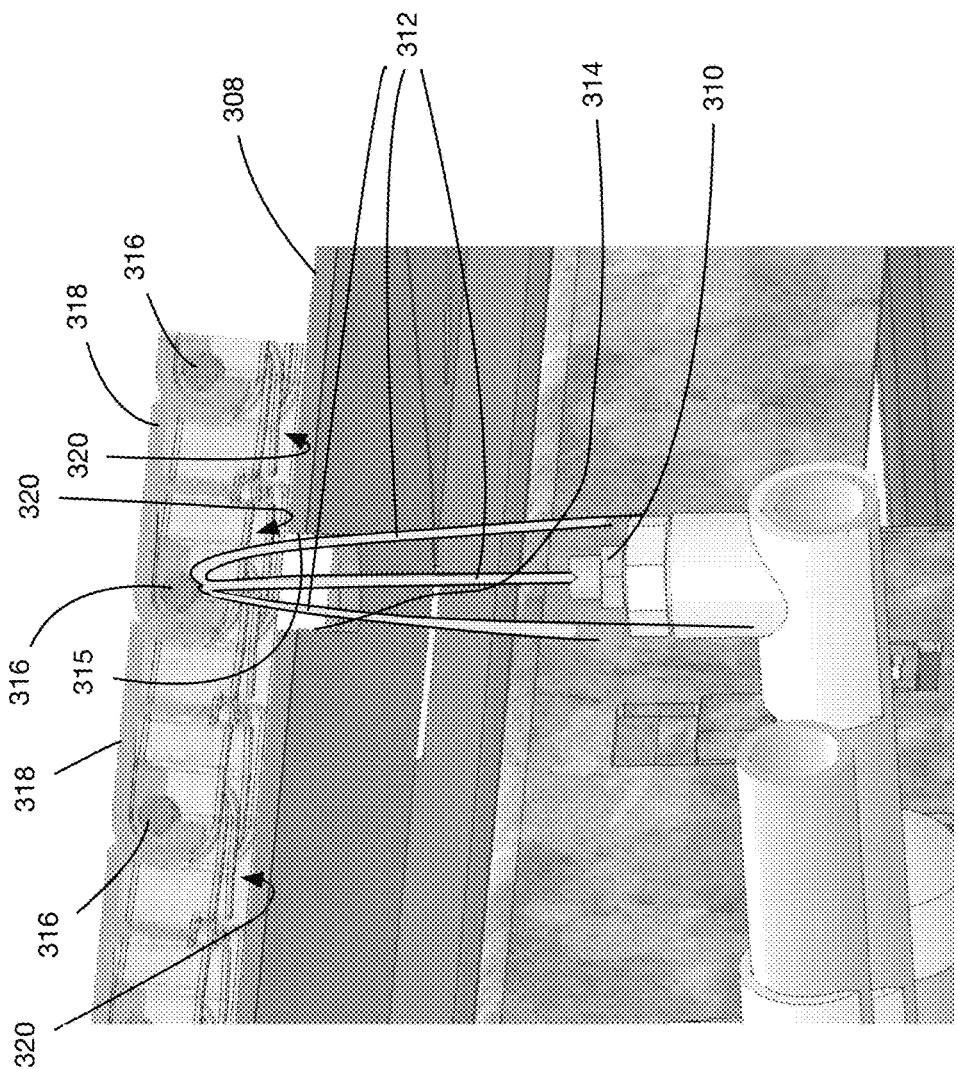

Reference is made to FIG. 13. As can be seen, the rinsing system outlets 310 are positioned below the wear plates 308 and are positioned to eject the rinsing system liquid up through the rinsing system dirt pass-through aperture 306 into the belt 36. The rinsing system dirt pass-through aperture 306 has an elongate cross-sectional shape and is sized to permit the ejecta 312 (i.e., the rinsing system liquid ejected therefrom) to leave upwardly from the rinsing system dirt pass-through aperture 306, to hit the endless belt 36 and to fall through the rinsing system dirt pass-through aperture 306 after hitting the endless belt, bringing dirt with it, as shown in FIG. 13. For example, in the embodiment shown, the outlet 310 is well below the wear plate 308 and so the ejecta 312 pass upwardly through the rinsing system dirt pass-through aperture 306, hit the belt 36 and then fall back down through the aperture 306.

The apertures 306 are shown as being angled, similarly to the apertures (slots) 170 in the wear plates 88, for the purpose of ensuring that segments of the belt 36 are always supported and do not impact against an aperture edge. This is the same reason described for the angle of the slots 170. Similar angular ranges may be used for the orientation (i.e., the angle) of the apertures 306.

As can be seen, each rinsing system outlet 310 is in the form of a fan jet nozzle configured for ejecting rinsing system liquid 312 in the form of ejecta 312 having an elongate cross-sectional shape (e.g., a flat spray pattern).

Figure 11:
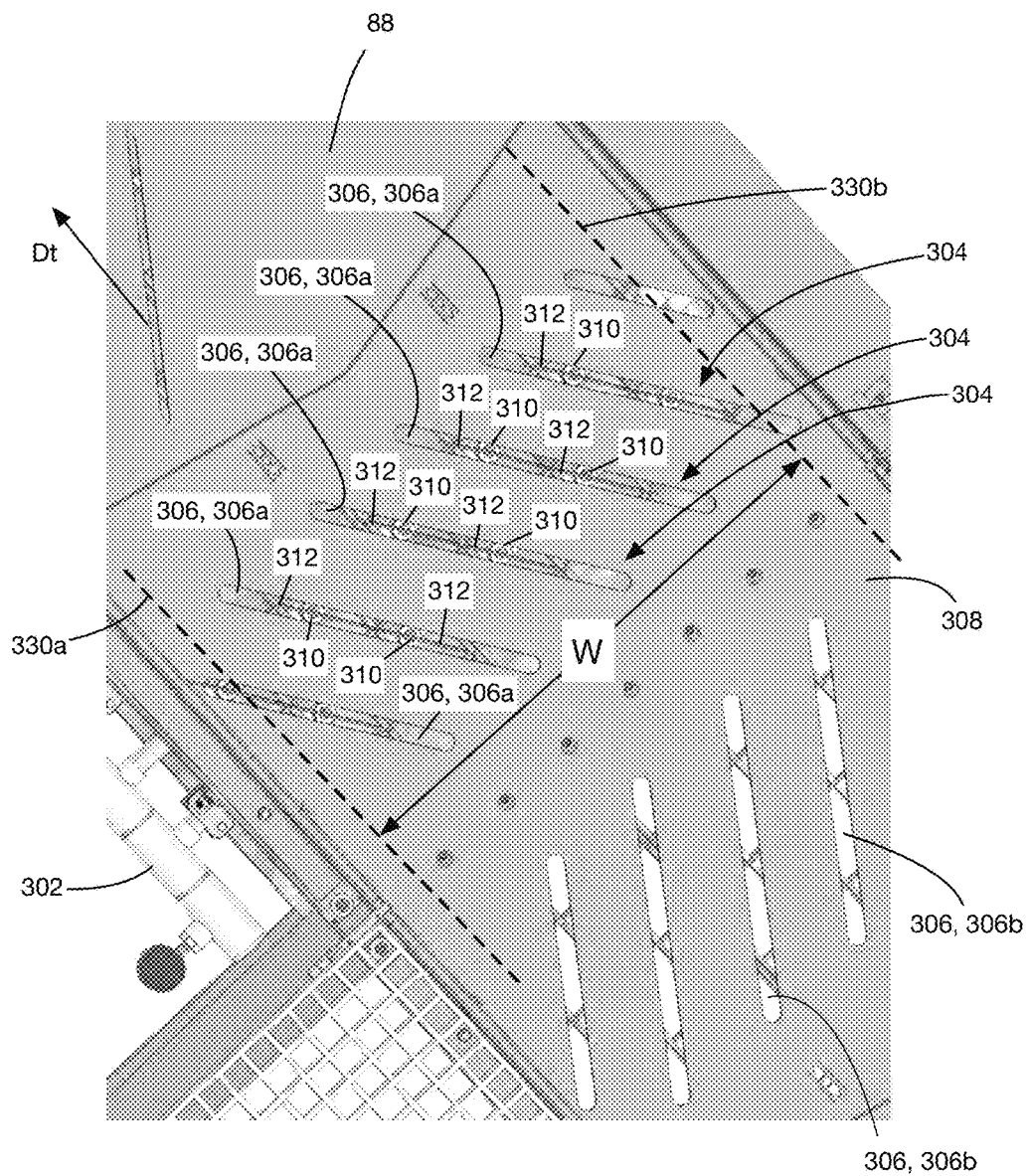

Referring to FIG. 11, dashed lines shown at 330a and 330b represent the side edges of the endless belt 36. The belt 36 has a width W. As can be seen, the at least one belt rinsing arrangement 302 includes enough of the rinsing system outlets 306 to eject rinsing system liquid 312 (i.e., ejecta 312) on the entire width of the belt 36. There is some offset between the apparent position of the ejecta 312 and the position of the side edges 330a and 330b of the belt 36 in the view shown in FIG. 11 however, it will be understood that this is merely a result of the difference in elevation of the outlets 310 and the belt 36.

Figure 12:
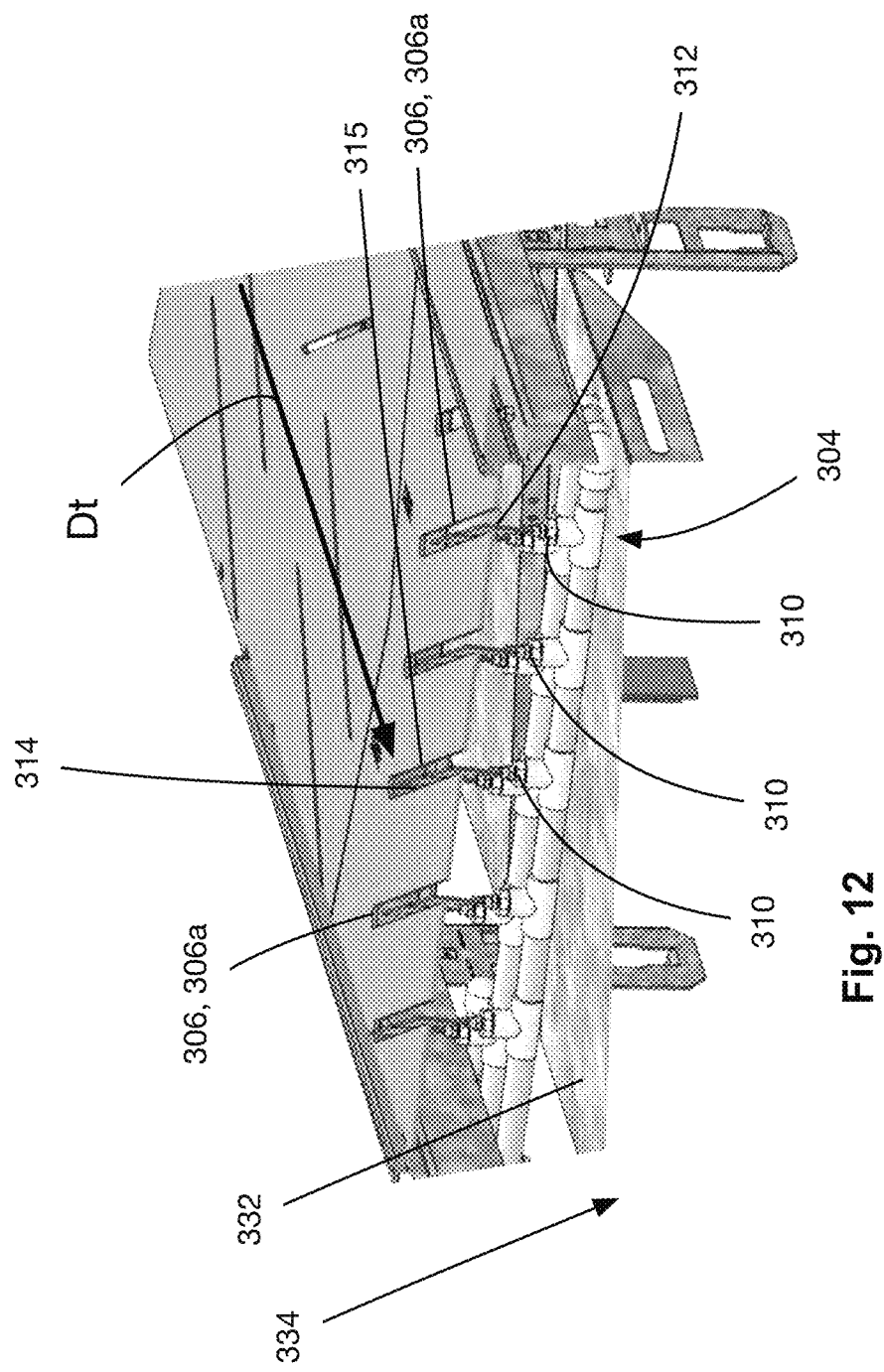

In FIG. 12, a debris deflector 332 is provided and may be similar to any of the debris deflectors shown and described herein. The debris deflector 332 is positioned underneath the rinsing system dirt pass-through aperture 306 to collect dirt falling through the rinsing system dirt pass-through aperture 306, and sloped downwardly away from the rinsing system dirt pass-through aperture 306 in order to transport collected dirt towards a dirt collection area shown at 334.

Figure 14:
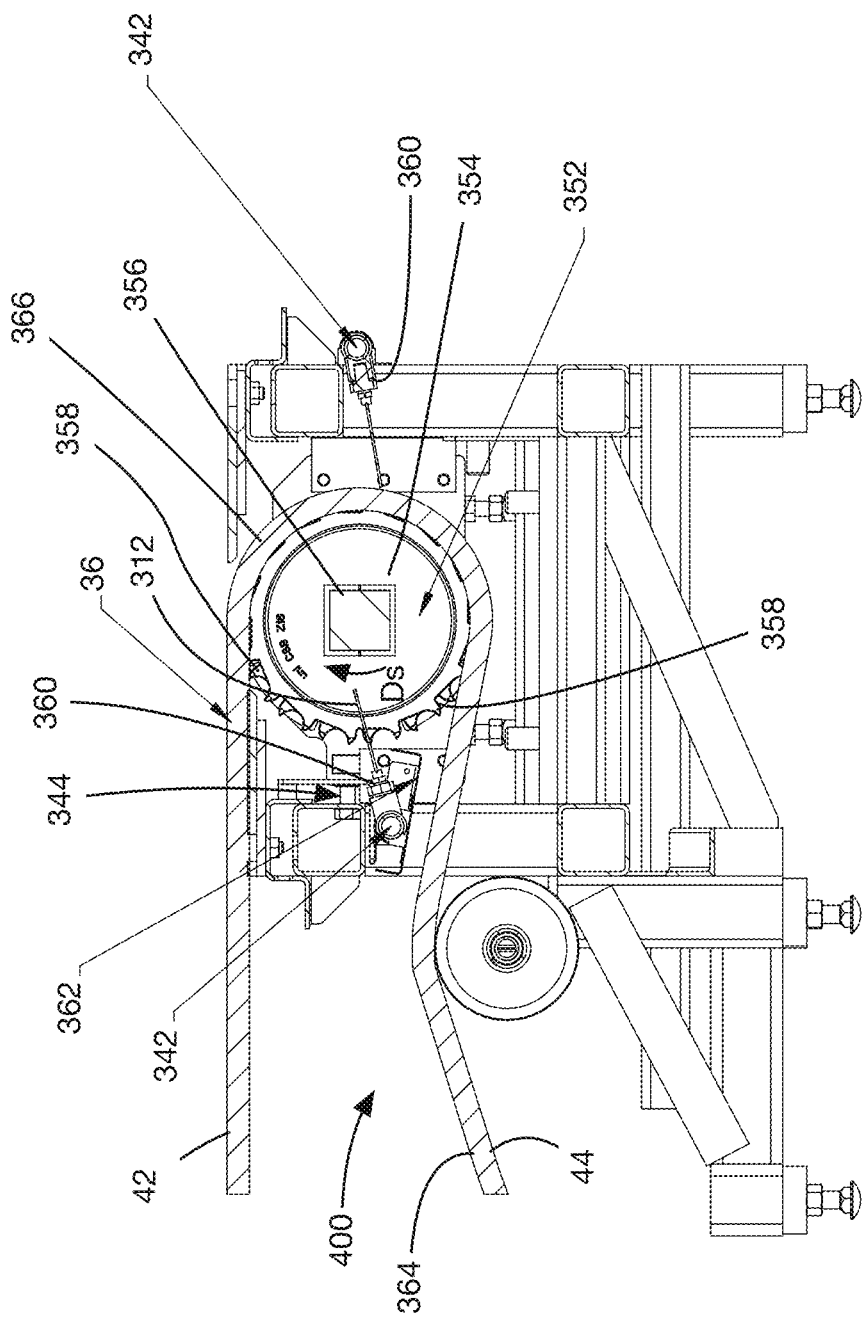
FIGS. 14-18 show a flooding system for the conveyor system.
Figure 15:
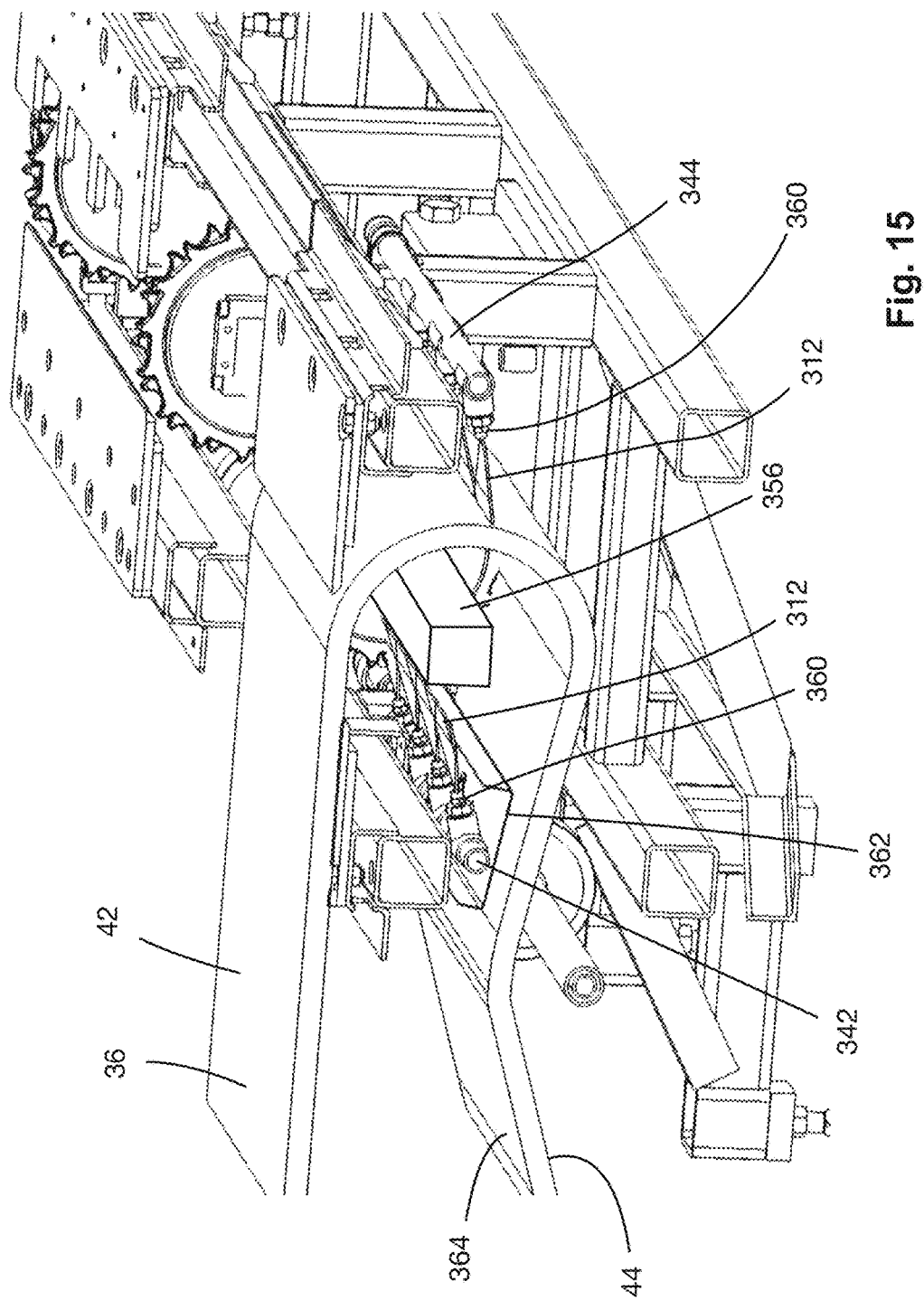

Reference is made to FIGS. 14 and 15, which show another rinsing system 340, which includes a rinsing system conduit arrangement 342 which is connectable to a source of rinsing system liquid (e.g., a city water supply or a reclaim water system). The rinsing system 340 further includes at least one sprocket rinsing arrangement 344 configured to rinse and remove dirt from a sprocket arrangement 352 that is used to drive the belt 36. The sprocket arrangement 352 in the present example includes a plurality of sprockets 354 that are mounted on a drive shaft 356. Alternatively, the sprocket arrangement 352 could include a single sprocket 354.

The drive shaft 356 in the present example is square and passes through square apertures in the sprockets 354, however it will be understood that other shapes for the drive shaft 356 and apertures are possible. The sprocket arrangement 352 has sprocket teeth 358 that engage the belt 36 to drive the belt 36. The direction of rotation of the sprocket arrangement 352 is shown at Ds in FIG. 14.

Each belt rinsing arrangement 344 further includes at least one rinsing system outlet 360 from the rinsing system conduit arrangement 342. The at least one rinsing system outlet 360 is positioned proximate to the sprocket arrangement 352 and is positioned to eject rinsing system liquid 312 onto the sprocket arrangement 352.

As rinsing system liquid 312 is ejected onto the sprocket arrangement 352, it rinses some dirt off a portion of the surface of the sprocket arrangement 352 prior to engagement between that portion of the surface of the sprocket arrangement 352 and the belt 36. As a result, there is less dirt that would cause wear of the belt 36 during engagement with the sprocket arrangement 352. Such wear on the belt 36 can reduce the efficacy of the engagement with the teeth 358 on the sprocket arrangement 352. Additionally, the presence of the dirt itself can inhibit good engagement between the teeth 358 and the belt 36 which can result in increases stresses on certain areas of the belt 36 during such engagement.

A debris collection guide 362 is provided underneath the at least one rinsing system outlet 360 to collect at least some of the liquid that has hit the sprocket arrangement 352 and reflected or dripped off the sprocket arrangement 352 thereafter along with any dislodged dirt or any dirt entrained in the reflected liquid or the liquid that has dripped off the sprocket arrangement 352. The debris collection guide 362 guides collected debris to a debris collection area (not shown).

Some rinsing system liquid 312 may wind up on the lower return portion 44 of the belt 36 instead of in the debris collection guide 362. This is not considered problematic, since the inner surface of the lower return portion (shown in FIG. 14 at 364) does not engage any surfaces with significant force until reaching the idler drum at the other end of the conveyor system 20. Some of the dirt and liquid collected on the inner surface 364 of the lower return portion 44 of the belt 36 will have fallen off the belt 36 by the time it reaches the other end. As noted above, the rinsing system 300 can be provided at the upstream end of the upper transport portion 42 of the conveyor system 10, so as to rinse off dirt thereon prior to a lot of sliding engagement with the wear plates 88.

FIG. 15 is a perspective view of the rinsing system 340, but with the sprocket arrangement 352 removed. As shown in FIG. 15, the rinsing system outlets 360 may be in the form of fan (flat spray) jet nozzles, and may be configured to eject rinsing system liquid 312 in flow patterns that overlap with one another and which are configured to cover the width of the sprocket arrangement 352.

As can be seen in FIGS. 14 and 15, optionally, the rinsing system 340 further includes at least one belt rinsing arrangement including at least one rinsing system outlet 360 positioned to spray rinsing system liquid 312 on the outer face (shown at 366) of the belt 36, to further clean the belt 36 while the belt 36 is engaged with the sprocket arrangement 352.

Figure 16:
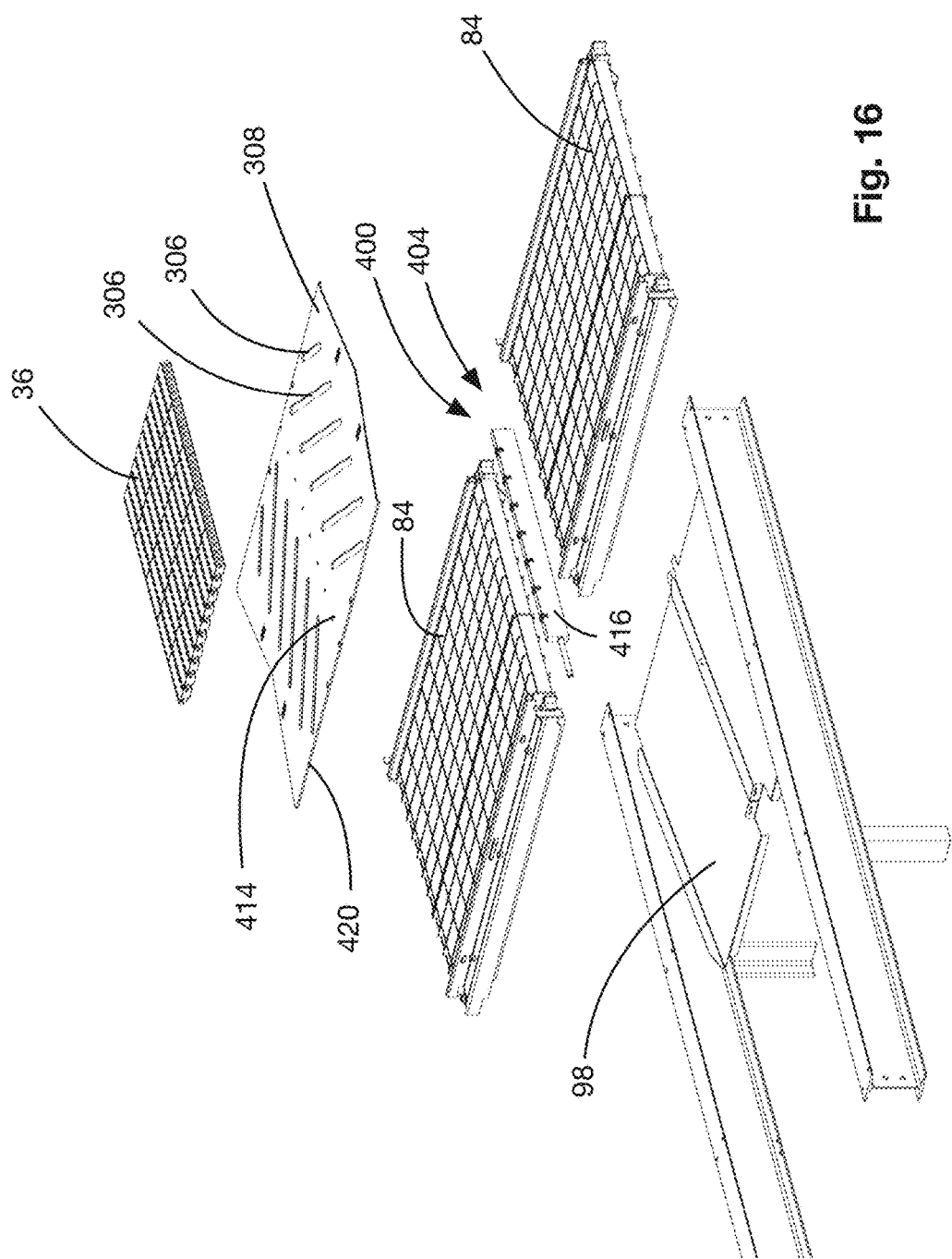
Figure 17:
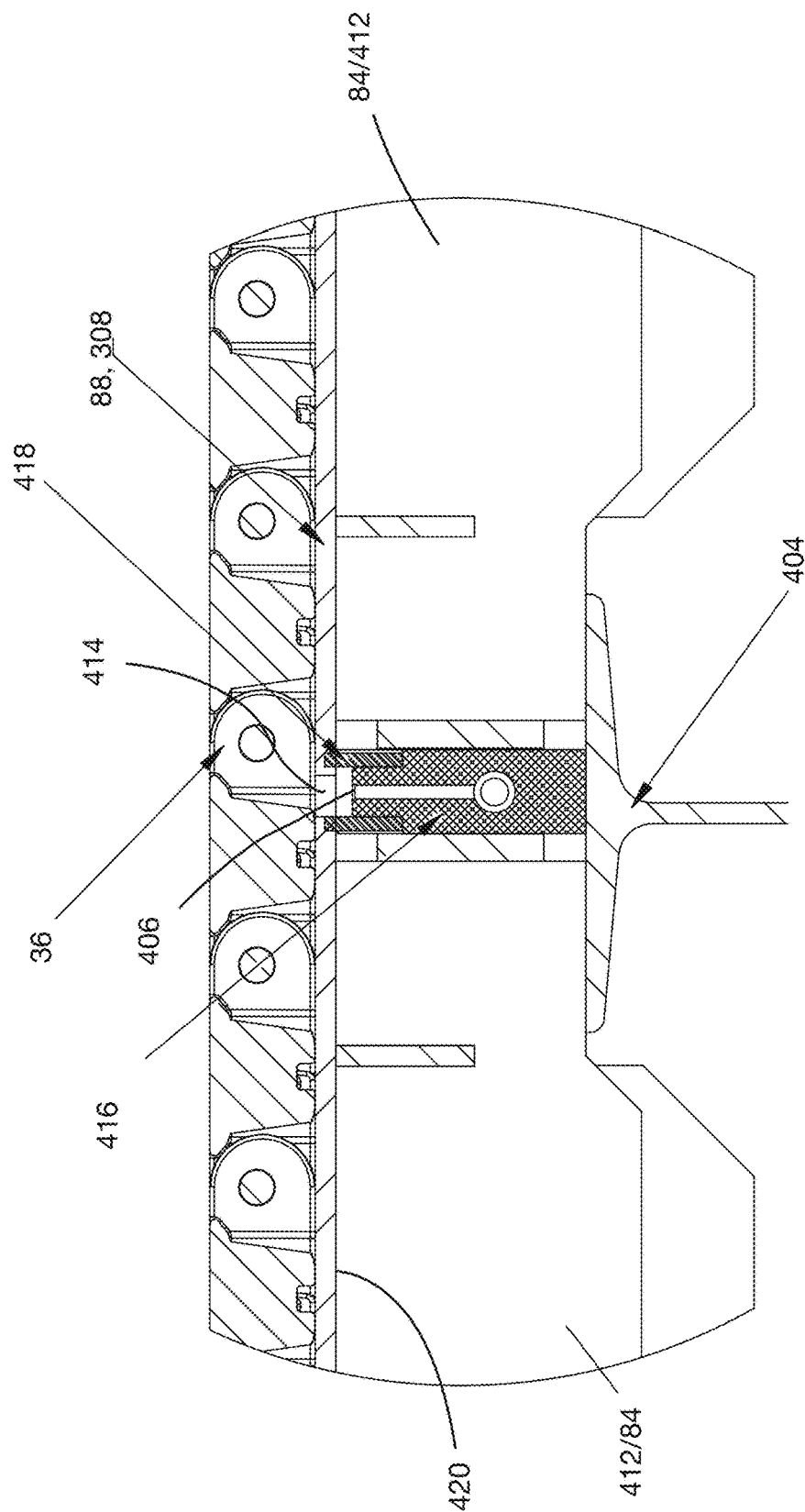

Reference is made to FIGS. 16 and 17, which show a flooder system 400 for the conveyor system 20. The flooder system 400 is used to introduce liquid between the endless belt 36 and the wear plate (e.g., wear plate 88 or wear plate 308). The flooder system 400 includes a flooder system conduit arrangement 402 connectable to a source of flooder system liquid (such as city water, or a source of city water mixed with soap, wax or some other lubricant), and at least one belt flooding member 404. Each belt flooding member 404 includes at least one flooding system outlet 406 (and optionally a plurality of outlets 406 which are spaced apart laterally) from the flooding system conduit arrangement 402. The outlet or outlets 406 are positioned underneath the endless belt 36 and are positioned to introduce flooding system liquid 408 between the endless belt 36 and the wear plate. The liquid 408 introduced helps to reduce friction between the belt 36 and the wear plate 88 or 308 in part by entraining dirt that may be present therebetween.

The liquid pressure at the outlets 406 may be relatively low, lower than the pressure at the outlets 310. For example, the pressure may be about 2 psi, but is preferably higher, such as in the range of 5-10 psi or even higher.

The support deck (e.g., the wear plates 88 and 308) includes a plurality of dirt pass-through apertures as described above. These apertures will permit the dirt and liquid from the flooding system to fall through, thereby removing dirt from the interface between the belt 36 and the wear plates 88 and 308. The flooding system 400 may include a plurality of belt flooding members 404 positioned at selected distances longitudinally from one another, such as, for example, about every 20 to 30 feet from one another. Optionally, each belt flooding member 404 is positioned between gratings 412 that support the wear plate 88 or 308 and thus may act as a spacer between these gratings 412. The gratings 412 need not be gratings and may also be identified more broadly as wear plate support members 412. The wear plate 88 or 308 has flooding system apertures 414. Each flooding member 404 may include a bar 416 that acts as a manifold and that has a plurality of outlets 406 thereon. The flooding member 404 may further include seal members 418 (e.g., rubber bushings) that are positioned between the outlets 406 and the underside (shown at 420) of the wear plate 88 or 308 to form a seal therebetween.

Figure 19A:
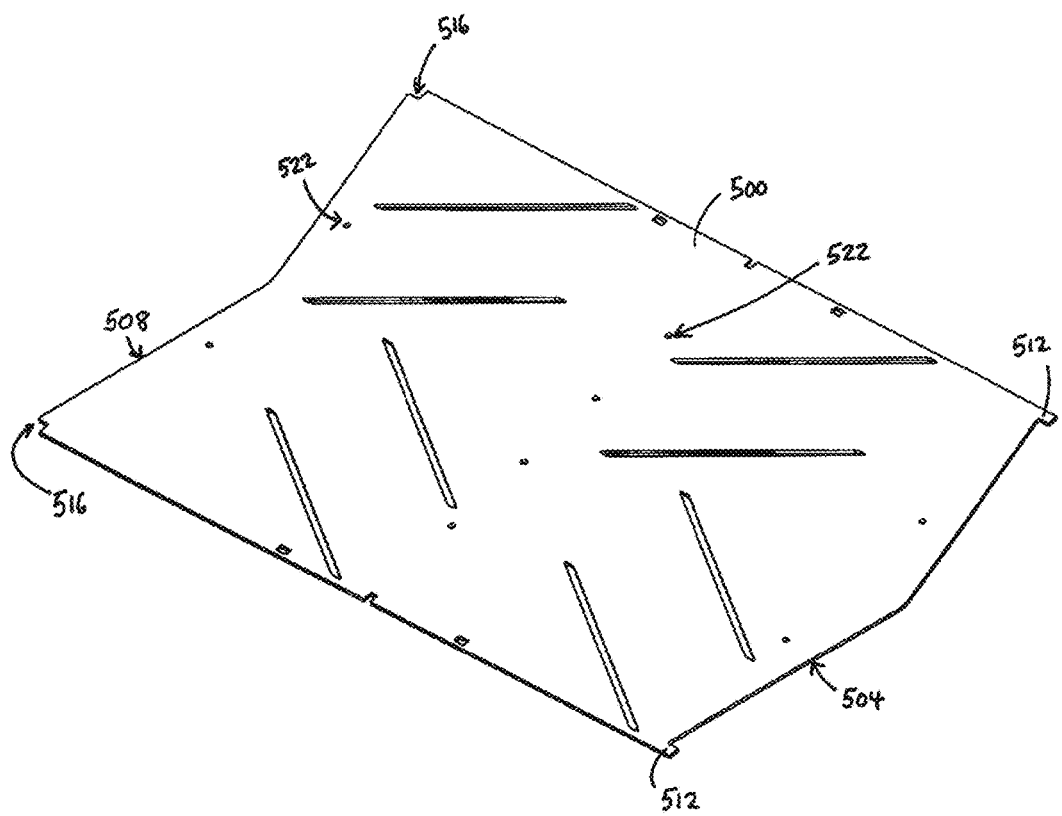
FIGS. 19a-19c show wear plates according to an alternative embodiment.
Figure 19B:
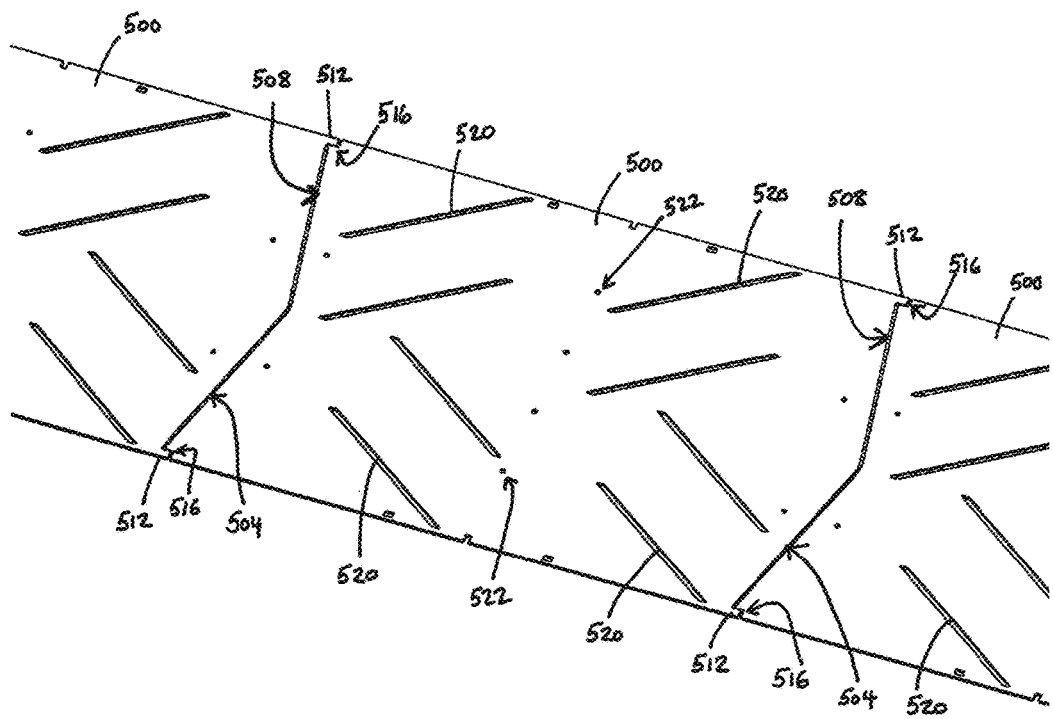
Figure 19C:
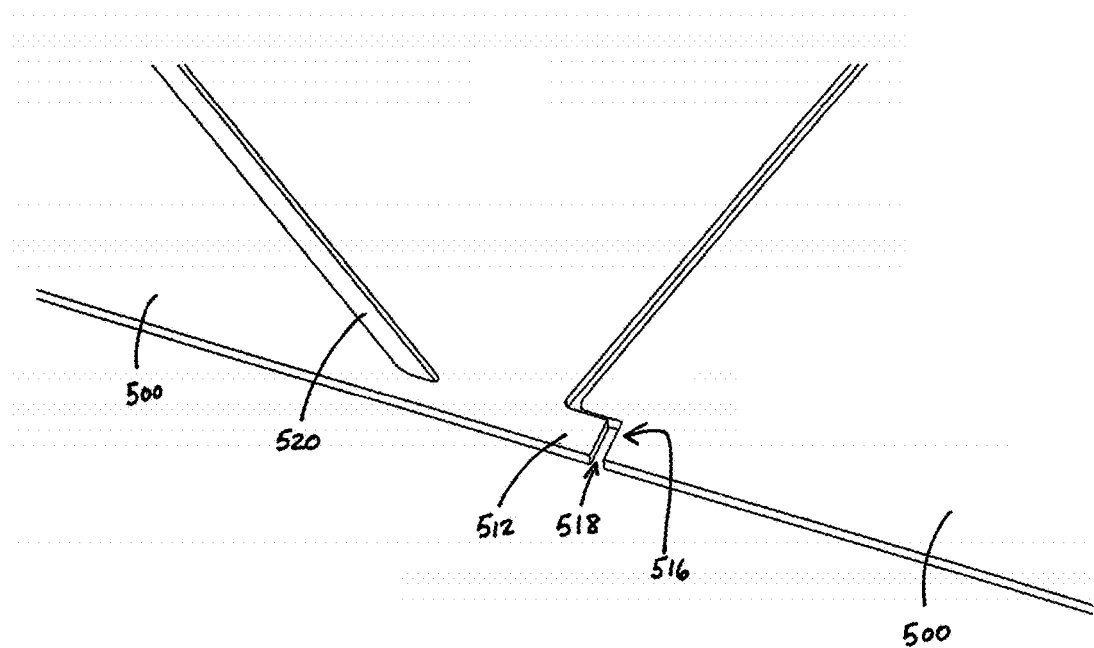

FIGS. 19a to 19c show wear plates 500 in accordance with another embodiment. The wear plates 500 are similar in size and construction to wear plates 88 shown in FIGS. 7, 8, 11a, and 11b. In particular, each of the wear plates 500 includes a leading edge 504 and a trailing edge 508, wherein the leading and trailing edges 504 and 508 are provided with complementary profiles to facilitate fit and alignment between adjacently positioned wear plates 500. In the embodiment shown, the complementary profile is provided generally in the form of a chevron aligned to the direction of travel of the vehicle through the wash tunnel. At least one of the leading and trailing edges 504 and 508 of the wear plates 500 may be chamfered to reduce the likelihood of wear upon the endless belt.

Like the wear plates 88, the wear plates 500 expand and contract with temperature changes. To allow for this expansion and contraction, the wear plates 500 are secured via fasteners inserted through fastener holes 522 that fit within slotted holes of the modular grid panels of the support deck. This arrangement allows a degree of freedom of movement (or, more to the point, expansion) of the wear plates 500. It can also be desirable to maintain the leading and trailing edges 504 and 508 in lateral alignment to avoid changes in the lateral profile of the belt contact surface (i.e., the wear plates 500) in the longitudinal direction that can serve to more quickly wear and/or damage the endless belt.

To this end, the wear plates 500 have mating features inhibiting lateral shifting of the wear plates 500 relative to one another in the form of fingers 512 that extend longitudinally (i.e., generally along the direction of travel of the endless belt) forward from lateral ends of the leading edges 504, and corresponding finger recesses 516 that extend longitudinally from lateral ends of the trailing edges 508. The fingers 512 mate with the finger recesses of adjacent wear plates 500 to maintain the wear plates 500 in lateral alignment while the wear plates 500 expand to reduce an expansion gap 518 between the wear plates 500, and contract.

In other embodiments, the fingers can extend longitudinally from the trailing edge and mate with corresponding finger recesses of the leading edge of an adjacent wear plate. Alternatively, a finger and a recess can be located on opposite lateral ends of each leading and trailing edge and mate with the corresponding features of adjacent wear plates. Other types of mating features that inhibit lateral shifting of the wear plates will occur to those skilled in the art.

The wear plates 500 also have debris slots 520 that permit the evacuation of debris therethrough, so as to reduce the accumulation of debris between the endless belt and the wear plates 500.

Figure 20A:
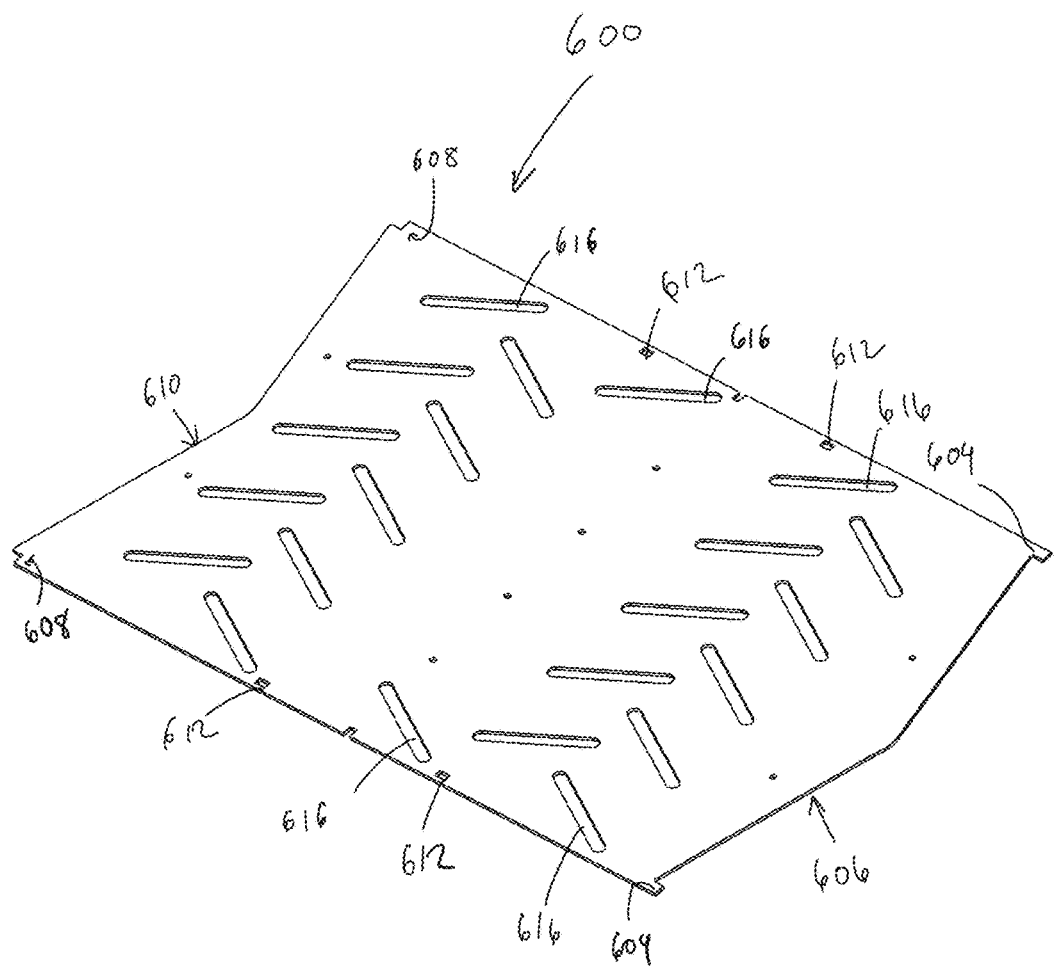
FIGS. 20a and 20b show wear plates according to other alternative embodiments.
Figure 20B:
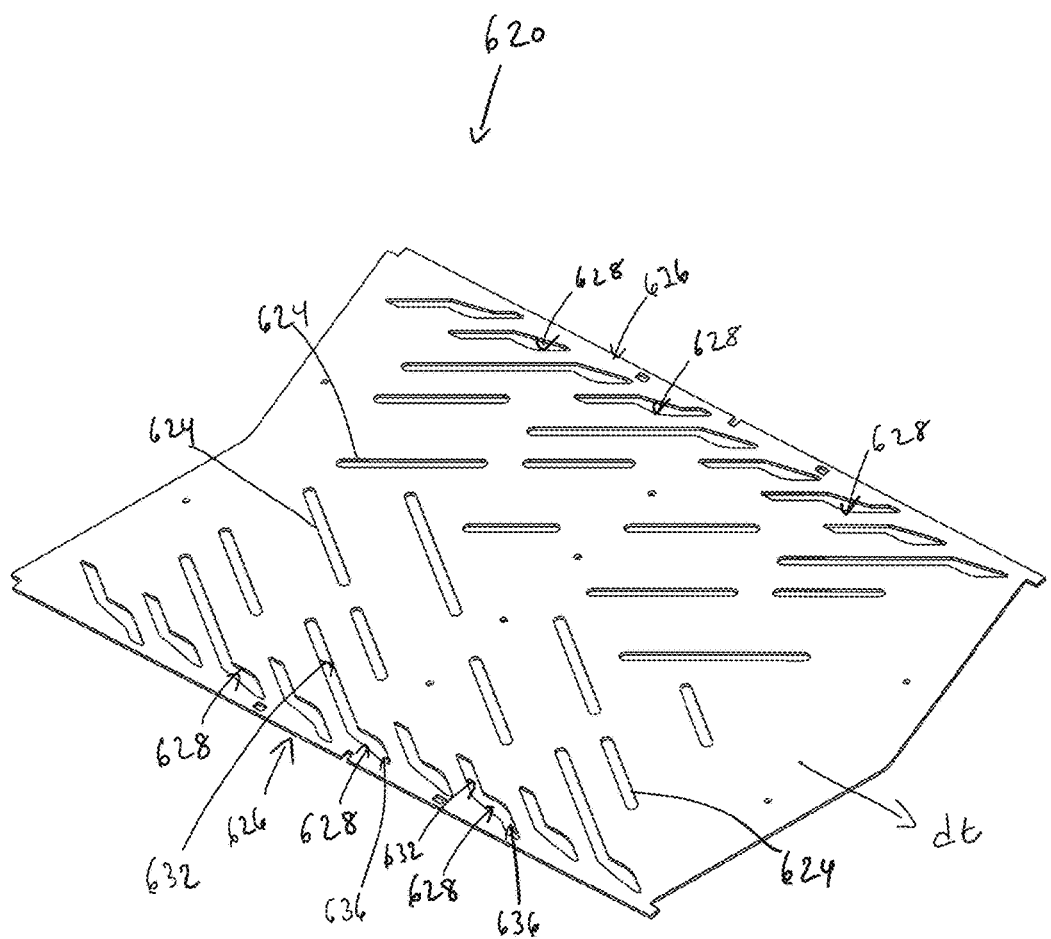

FIGS. 20a and 20b show two variants of the design of the wear plates. A wear plate 600 shown in FIG. 20a has fingers 604 that extend longitudinally (i.e., generally along the direction of travel of the endless belt) forward from lateral ends of the leading edge 606, and corresponding finger recesses 608 that extend longitudinally from lateral ends of the trailing edge 610. The fingers 604 mate with the finger recesses of adjacent wear plates 600 to maintain the wear plates 600 in lateral alignment while the wear plates 600 expand to reduce an expansion gap between the wear plates 600, and contract. A set of four locating slots 612 are positioned two along each lateral side of the wear plate 600. The wear plate 600 has a pattern of debris slots 616 that differs from those shown in the previous figures. In particular, the debris slots 616 are wider and shorter, enabling ample drainage without significantly affecting the structural integrity of the wear plate 600. That is, there are no portions of the wear plate 600 that are connected to the remainder of the wear plate 600 only by narrow sections.

A wear plate 620 shown in FIG. 20b has similar features to the wear plate 600 of FIG. 20a, but has different pattern of varying dimensioned debris slots. A first set of longitudinal debris slots 624 are generally rectangular with rounded corners, similar to the debris slots described and illustrated above, and are located centrally between the lateral sides 626 of the wear plate 620. A second set of peripheral debris slots 628 extend adjacent to the lateral sides 626 of the wear plate 620. Each of the peripheral debris slots 628 has a longitudinal portion 632 extending along a similar direction as the longitudinal debris slots 624, and a lateral portion 636 that deviates from the longitudinal portion 632 and extends along the travel direction dt of the belt. It has been found that, in some cases, debris travels down the lateral sides of the endless belts and gets underneath between the endless belt and the wear plates. The peripheral debris slots 628, and their lateral portions 636 in particular, assist in quickly flushing away this debris to reduce its chances of lingering between the endless belt and the wear plate 600.

Figure 21:
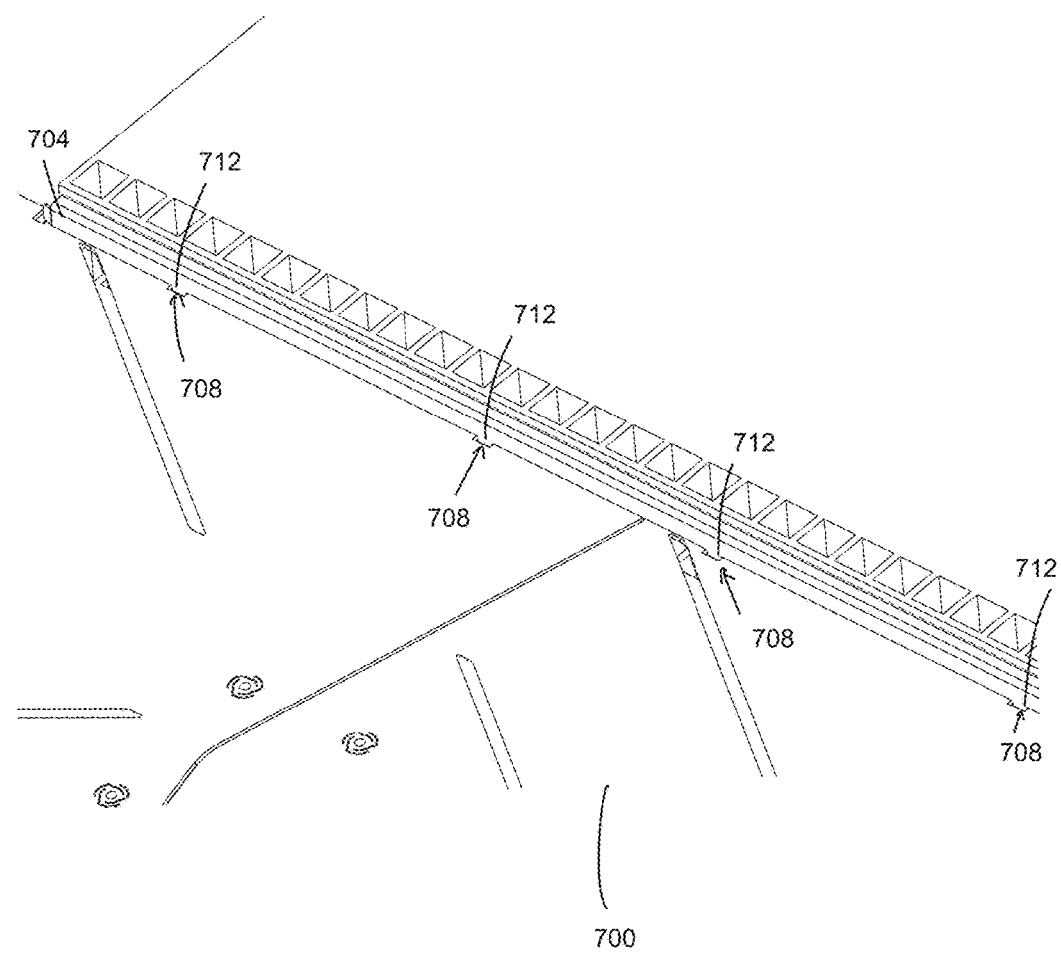
FIG. 21 shows the mating features of edge guides and wear plates according to an alternative embodiment.

FIG. 21 shows locating features of a wear plate 700 and an edge guide 704 that assist with maintaining the correct alignment of the wear plates 700 while enabling them to expand and contract as a result of fluctuations in the operating temperature. The wear plates 700 have locating slots 708 along their lateral edges. The edge guide 704 is made of 14 gauge stainless steel that has a curved profile, enabling it to be deflected as the wear plates 700 are being positioned. Locating tabs 712 of the edge guide 704 mate with the locating slots 708 of the wear plates 700. The size of the locating tabs 712 and the locating slots 708 are selected to enable the wear plates 700 to expand and contract.

FIGS. 22 to 26 show a wear plate 800 and a set of the wear plates 800 in use in a conveyor system in accordance with another embodiment. The conveyor system is similar to those shown in FIGS. 1 to 18.

A set of the wear plates 800 are shown deployed as part of a support deck 804 for an endless deck 808, a portion of which is shown. The support deck 804 is similar to the support deck 84 shown in FIGS. 4 to 8, 10*a* to 13 except that it is adapted for the wear plates 800. The support deck 804 generally includes a plurality of modular grid panels 812 adapted to be positioned end to end relative to one another along the longitudinal length of the service line. The modular grid panels 812 are made of fibre-reinforced plastic (hereinafter "FRP") or another material that is suitably hard. FRP is more economical than stainless steel for grid panels, but does not possess the same resistance to bending that stainless steel has. Accordingly, the modular grid panels 812 are positioned atop of three inner support rails 813, with the central inner support rail 813 supporting the centre of the modular grid panels 812 that generally bears the most load when a vehicle is being transported by the conveyor system. A pair of carryway channels 814 extend along either side of the support deck 804 and are bolted to transverse I-beams, such as those shown in FIG. 16.

Figure 25:
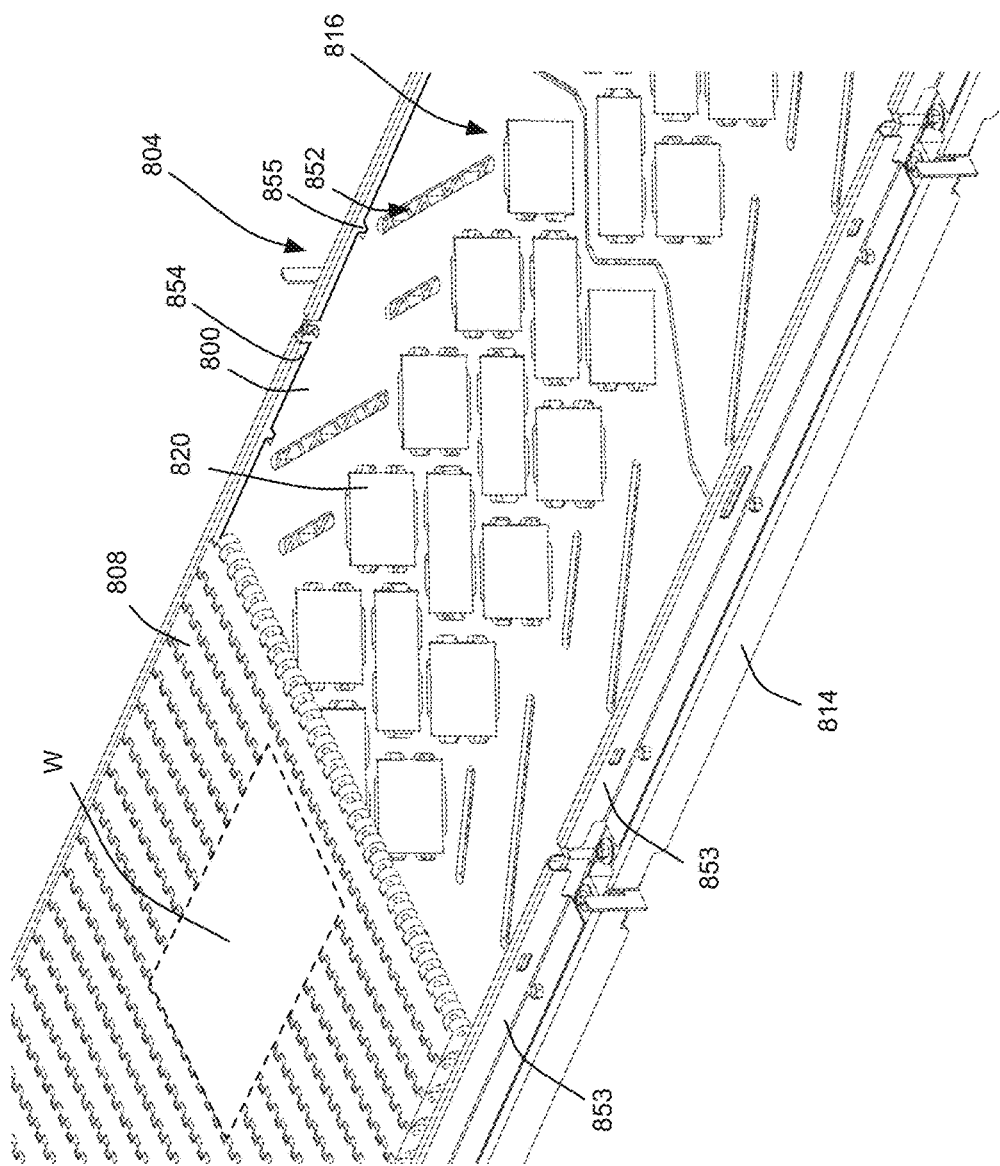
FIG. 25 is a perspective view of the support deck of FIG. 23 having a portion of an endless belt deployed thereon.
Figure 26:
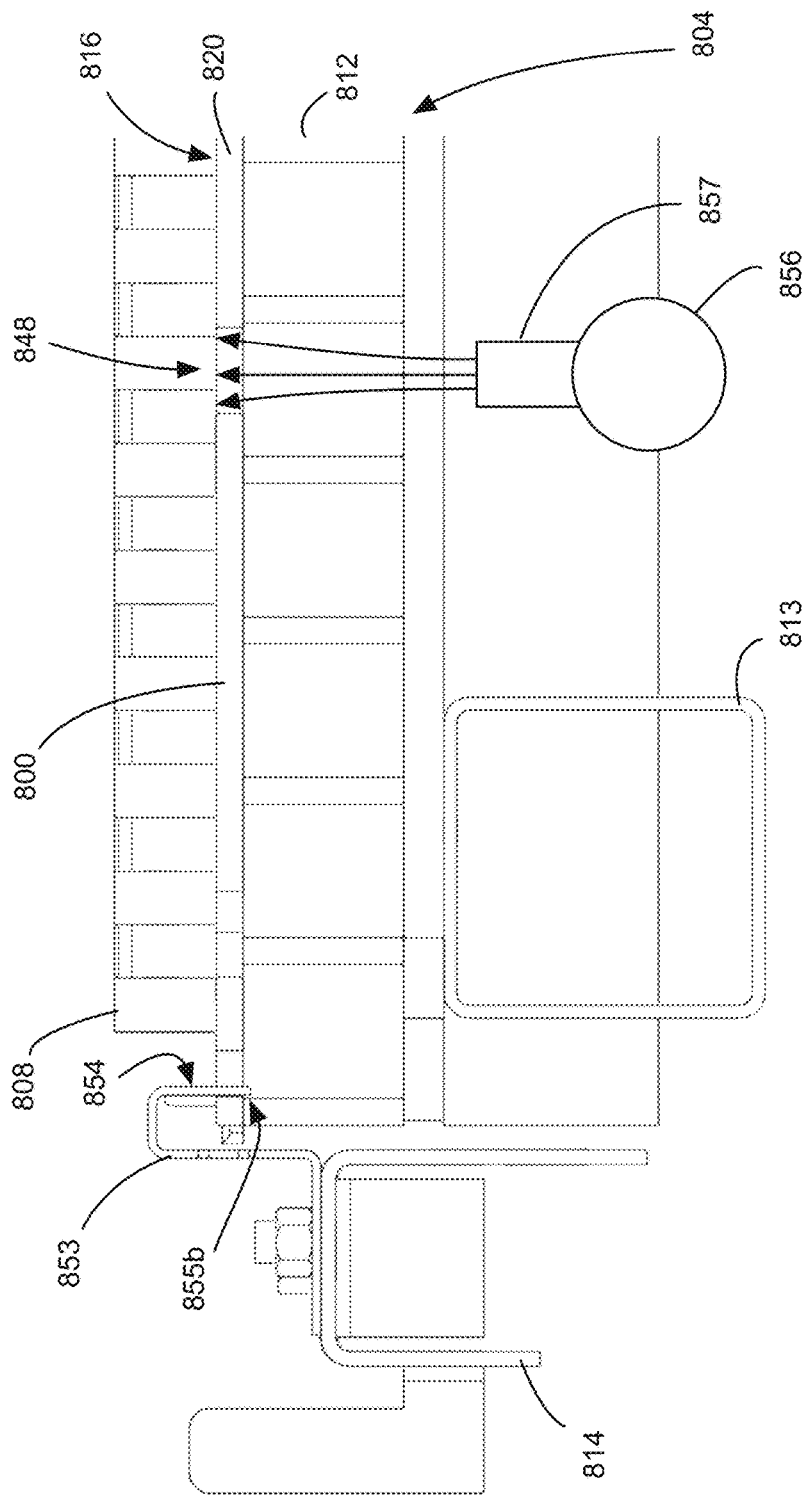
FIG. 26 is a cross-sectional elevation view of the support deck of FIGS. 24 and 25.

The support deck 804 is positioned between an upper transport portion of the endless deck 808, shown in FIG. 25, and a lower return portion of the endless deck 808. In this way, the support deck 804 provides support to the upper transport portion of the endless deck 808, and thereby a load placed thereon from a wheeled structure placed upon the conveyor system.

To facilitate sliding of the upper transport portion of the endless belt 808 over the support deck 804, a belt contact surface 816 is provided on an upper surface of the support deck 804. The belt contact surface 816 is the portion of the support deck 804 facing the upper transport portion of the endless deck 808 during normal use. The belt contact surface 816 includes a set of the wear plates 800 as well as a set of ceramic inserts 820 positioned within openings 824 of the wear plates 800.

The wear plates 800 are similar in size and construction to the wear plates of FIGS. 19*a* to 21, and are made from a material that is at least partially from a polymer. The polymer can be a thermoplastic, such as a polyethylene, in some implementations. Preferably, the material is an ultra-high-molecular-weight polyethylene or a high-density polyethylene.

Each of the wear plates 800 includes a leading edge 828, a trailing edge 832, and two parallel lateral edges 836 that are generally straight. A pair of securement apertures 839 are positioned adjacent to each of the lateral edges 836. The leading edge 828 and the trailing edge 832 are designed so that the trailing edge 832 of the wear plate 800 mates with the leading edge 828 of an adjacent wear plate 800.

A set of clamping edge guides 853 are secured to the carryway channels 814 via a set of bolts or any other suitable means after positioning of the wear plates 80 on the modular grid panels 812. Each of the clamping edge guides 853 has a clamping portion 854 that clamps one or more wear plates 800 (depending on the sizing, but two halves in the illustrated embodiment) towards the modular grid panels 812 close to the lateral edges 836. Retaining tabs 855 of the clamping portion 854 fit within the securement apertures 839. The clamping edge guides 853 restrict lateral movement of the endless belt 808 as it travels over the belt contact surface 816.

The wear plates 800 expand and contract with temperature changes. To allow for this expansion and contraction, the wear plates 800 are secured via the clamping edge guides 853 so that their general longitudinal position along the modular grid panels 812 is fixed via the retaining tabs 855 inserted into the securement apertures 839. The securement apertures 839 of the wear panels 800 extend further longitudinally than the retaining tabs 855 of the clamping edge guides 853, thus enabling expansion of the wear plates 800 longitudinally. The wear plates 800 have mating features inhibiting lateral shifting of the wear plates 800 relative to one another in the form of fingers 864 that extend longitudinally (i.e., generally along the direction of travel of the endless belt) forward from lateral ends of the leading edges 828, and corresponding finger recesses 868 that extend longitudinally from lateral ends of the trailing edges 832. The fingers 864 mate with the finger recesses 868 of adjacent wear plates 800 to maintain the wear plates 800 in lateral alignment while the wear plates 800 expand to reduce an expansion gap 872 between the wear plates 800, and contract.

In other embodiments, the fingers can extend longitudinally from the trailing edge and mate with corresponding finger recesses of the leading edge of an adjacent wear plate. Alternatively, a finger and a recess can be located on opposite lateral ends of each leading and trailing edge and mate with the corresponding features of adjacent wear plates. Other types of mating features that inhibit lateral shifting of the wear plates will occur to those skilled in the art.

Each of the ceramic inserts 820 is rectangular, having four lateral sides 840 that meet at right angles. The ceramic inserts 820 may be commercially available ceramic tiles or may be custom-made. In particular, the ceramic inserts 820 may be ceramic tiles produced for lining chutes in mining operations that are made of approximately 92 percent aluminum oxide, and other agents, such as a bonding agent or agents.

In the illustrated embodiment shown in FIG. 23, the ceramic insert 820 is bonded to a compressible layer in the form of a compressible backing 844 that enables slight downward depression of the ceramic insert 820 when positioned in one of the openings 824. In particular, the compressible backing 844 is made at least partially of a neoprene rubber of suitable durometer and thickness, but, in other embodiments, any other suitably resilient and compressible material can be employed. It has been found that, by using the compressible backing 844 with the ceramic inserts 820, the incidence of fracturing of the ceramic inserts 820 as a result of slight variations in the thickness of the wear plates 800 or the flatness of a support surface upon which the wear plates 800 and the ceramic inserts 820 are positioned is significantly less frequent. In this manner, the compressible backing 844 is positioned under the ceramic inserts 820 to facilitate depression of the ceramic inserts 820 relative to the wear plate 800.

In other embodiments, however, the compressible layer can be omitted or can be deployed under both the wear plates 800 and the ceramic inserts 820 with corresponding cut-outs for rinsing system dirt pass-through apertures and flooder apertures.

Further, it can be advantageous to ensure that the top of the modular grid panels 812 are generally level to reduce uneven load on the ceramic inserts 820 as the wheels of a vehicle positioned on the endless belt 808 travel thereover. It has been found that a gritty side of the modular grid panels 812 is more level than the non-gritty side as the gritty substance applied to the gritty side forms a more uniformly level surface.

The wear plates 800 are manufactured via molding to have a thickness $t_{wp}$. A thickness $t_{ci}$ of the ceramic inserts 820 and the compressible backing 844, if present, corresponds generally to the thickness $t_{wp}$ of the wear plates 800. The thickness $t_{wp}$ of the wear plates 800 may be selected to be slightly greater than the thickness $t_{ci}$ of the ceramic inserts 820 so that any acceptable variances in the thickness $t_{ci}$ of the ceramic inserts 820 won't exceed the thickness $t_{wp}$ of the wear plates 824 to thereby avoid fracturing of the ceramic inserts 820. Where compressible backing is not deployed with the ceramic inserts 820, it may be more desirable to select a thickness $t_{wp}$ for the wear plates 800 that is marginally greater than in scenarios where the compressible backing 844 is deployed, as the compressible backing 844 provides tolerance to slight projection of a ceramic insert 820 over the wear plate 800.

The ceramic inserts 820 are oriented in a pattern along a central band $B_c$ of the wear plate 800. In particular, the ceramic inserts 820 are oriented so that the lateral sides 840 of the ceramic inserts 820 are at angles between 40 degrees and 50 degrees, and preferably at 45 degrees, to a longitudinal direction of travel $d_t$ of an endless belt traveling thereover. The orientation of the lateral sides 840 of the ceramic inserts 820 at 45 degrees has been found to reduce wear on an endless belt in comparison to other orientations, particularly where the lateral sides 840 of the ceramic inserts 820 are oriented perpendicular to the direction of travel $d_t$ of the endless belt.

Segments of the leading edge 828 and the trailing edge 832 of the wear plate 800 that are adjacent to ceramic inserts 820 are generally parallel to a closest one of the lateral sides 840 of the adjacent ceramic insert 820. Traditional wear plates typically have leading and trailing edges that are transverse to the longitudinal direction of travel $d_t$ of the endless belt 804. If such transverse edges were employed with the wear plate 800 with the obliquely oriented ceramic inserts 820, the gap between the ceramic inserts 820 would be significant. By jagging the leading and trailing edges 828, 832 of the wear plates 800, the gap between the pattern of obliquely oriented ceramic inserts 820 on adjacent wear plates 800 can be significantly reduced, and, thus, wear on the central band $B_c$ around the leading and trailing edges 828 and 832 can be reduced.

The position of a wheel atop of the endless belt 808 is shown generally at W. It has been found with conventional wear plates that, as wheels of a vehicle are generally more likely to be centrally positioned on an endless belt traveling over the wear plates, the greatest wear occurs along a central region of the belt contact surface 816 extending longitudinally. By employing the ceramic inserts 820, which have a relatively high resistance to abrasion, along the central band $B_c$, along which wheels such as wheel W are most likely to be positioned, the wear plates 800 wear more evenly, thus extending the lifetime of the wear plates 800 and the overall maintenance cost of the conveyor system.

The openings 824 within the wear plate 800 in which the ceramic inserts 820 are received are formed via any suitable known means such as milling, water jet cutting, etc. Each opening 824 is dimensioned so that is at least partially unobstructed when one of the ceramic inserts 820 is positioned therein. In particular, when the ceramic inserts 820 are inserted into the openings 824, one or more gaps 848 are present between the wear plate 800 and each of the ceramic inserts 820. The gaps 848 extend through the wear plate 800.

The openings 824 are sufficiently spaced from one another so that the strength of the wear plate 800 is not significantly compromised. A minimum spacing between openings 824 factors in the presence of the gaps 848. The pattern of the ceramic inserts 820 along the central band $B_c$ is selected based on a number of factors. Increasing the surface area of the central band $B_c$ of the wear plate 800 covered by ceramic inserts 820 increases the resistance to abrasion of the belt contact surface 816 provided by the wear plates 800 and the ceramic inserts 820. Increases in the size of the ceramic inserts 820 can lead to a greater chance of fracturing of the ceramic inserts 820. Increasing the spacing between ceramic inserts 820 improves the strength of the wear plates 800, but decreases the resistance to abrasion of the belt contact surface 816. It has been found that, by using rectangular ceramic inserts 820 and arranging the openings 824 for the ceramic inserts 820 as closely as possible without significantly deteriorating the strength of the wear plate 800 so that the lateral sides 840 of the ceramic inserts 820 are positioned at 45 degree angles relative to the direction of travel $d_t$, various advantages can be realized. Currently produced ceramic tiles can be used as ceramic inserts 820, thereby reducing the cost of production. Further, the strength of the wear plate 800 is maintained at a desirable level. Still further, degradation of the endless belt traveling thereacross is improved relative to conventional belt contact surfaces.

The central band $B_c$ is spaced from the lateral edges 836 of the wear plate 800 by peripheral bands $B_p$. A number of rinsing system dirt pass-through apertures 852 are situated along the peripheral bands $B_p$ to facilitate rinsing of debris from between an endless belt positioned thereon and the belt contact surface 816 provided by the wear plate 800 and the ceramic inserts 820. Each of the rinsing system dirt pass-through apertures 852 is aligned with at least one rinsing system outlet from a rinsing system conduit arrangement positioned proximate to the rinsing system dirt pass-through aperture 852 and positioned to eject rinsing system liquid onto an endless belt upstream from a downstream edge of the rinsing system dirt pass-through aperture 852 in order to capture at least some of the ejected liquid through the rinsing system dirt pass-through aperture 852.

Figure 18:
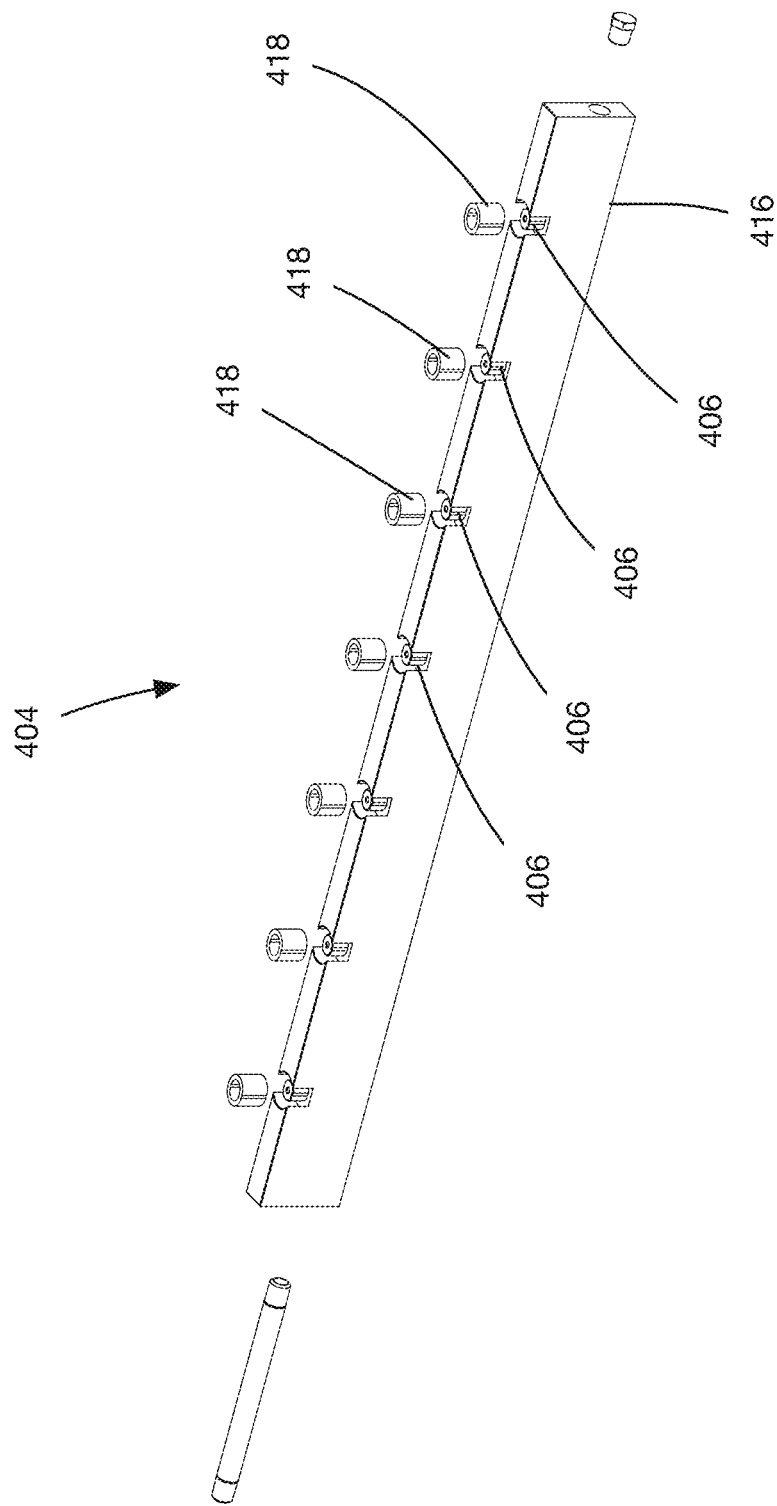

A belt rinsing system is provided in the conveyor system, and includes a rinsing system conduit arrangement 856 that is connected to a source of rinsing system liquid and at least one belt rinsing arrangement. Each belt rinsing arrangement includes at least one rinsing system outlet 857 that is positioned proximate to one of the rinsing system dirt pass-through aperture 852 and the gaps 848 (which acts as a rinsing system dirt pass-through aperture) to eject rinsing system liquid onto the endless belt 808 upstream from a downstream edge of the rinsing system dirt pass-through aperture in order to capture at least some of the ejected liquid through the rinsing system dirt pass-through aperture. The rinsing system liquid rinses away debris from between the belt contact surface 816 and the endless belt 808 positioned thereon. Still further, a flooder system 860 similar to that illustrated in FIG. 18 is employed to introduce liquid between the endless belt 808 and the belt contact surface 816 via the gaps 848 and the rinsing system dirt pass-through apertures 852. The rinsing system and the flooder system 860 induce the clearing of debris from between the belt contact surface 816 and the endless belt 808 and introduce water therebetween to facilitate travel of the endless belt 808 over the belt contact surface 816.

In a preferred embodiment, the width of the central band $B_c$ is between 30% and 80% of the entire width of the wear plate 800, and in particular, between 60% and 75%. In other embodiments, where a mass being transported on an endless belt atop of a belt contact surface is distributed more uniformly across a lateral width of the belt contact surface, it may be desirable to have the central band $B_c$ cover more or all of the lateral width of the belt contact surface.

When wear plates are manufactured at least partially from a polymer such as UHMWPE or HDPE, and especially when the wear plates are like the wear plates 800 that have the ceramic inserts 820 inserted in openings thereof along the central band $B_c$, the belt contact surface 816 is more highly resistant to wear from travel of the endless belt 808 thereover than without the ceramic inserts 820, thereby enabling the central band $B_c$ to wear at roughly the same rate as the peripheral bands $B_p$.

As will be appreciated, the size and shape of the ceramic inserts can be varied. FIG. 27 shows a ceramic insert 876 that is circular in form. Ceramic inserts that lack corners or have corners of less acute angles, such as the circular ceramic insert 876, or hexagonal or octagonal ceramic inserts, for example, may be more resistant to fracturing in some scenarios. Further, it can be desirable to use ceramic inserts of a smaller size in some circumstances. While the number of joints in the belt contact surface encountered by an endless belt may increase, the probability of fracturing of the ceramic inserts can decrease.

The dimensions of the cells of the support structure under the belt contact surface can be varied to more evenly distribute the load on the ceramic inserts as vehicles positioned in an endless belt pass thereover.

FIG. 28 shows a cross-section of a portion of a wear plate 900 and a ceramic insert 904 in accordance with an alternative embodiment. A horizontal profile of the ceramic insert 904 and an opening in the wear plate 900 in which the ceramic insert 904 is received decreases in size towards a top surface 904 of the wear plate 900 and the ceramic insert 904. Thus, the dimensions of the opening in the wear plate 900 and the ceramic insert 904 inhibit upward escape of the ceramic insert 904 from the opening when the wear plate 900 is positioned at the top of the support structure. As will be appreciated, the opening in the wear plate 900 can be dimensioned to define one or more gaps adjacent the ceramic insert 904 when the ceramic insert 904 is inserted into the opening. These gaps can serve as rinsing system dirt pass-through apertures and/or flooder system apertures.

While, in the above-described embodiments, the inserts are at least partially ceramic, in other embodiments, the inserts are made of any material having a higher resistance to abrasion than the wear plates. As such materials can be more brittle or expensive, it may not be desirable to construct wear plates entirely out of them. By using the materials in a sparing manner, in the form of inserts, the overall effective lifetime of the wear plate can be increased by using the inserts at least where wear otherwise occurs the most in a uniform polymer wear plate. Further, the cost of producing the belt contact surface can be reduced by reducing the amount of the more abrasion-resistant material. Exemplary materials for the inserts can include, for example, stainless steel, aluminum, high-performance plastic, titanium, and ceramic bonded to steel.

Figure 29:
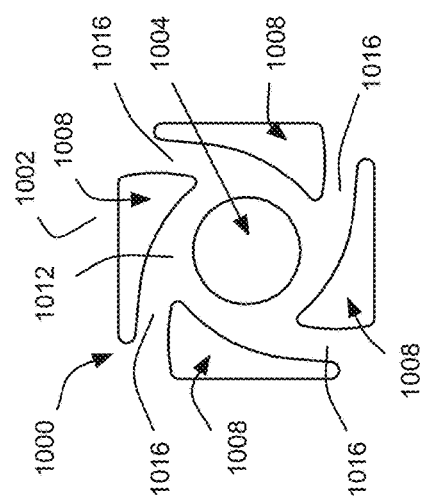
FIG. 29 shows a top view of a holddown of a wear plate in accordance with another embodiment.

FIG. 29 shows a holddown 1000 for a wear plate in accordance with another embodiment. The holddown 1000 is formed by water jet cutting a set of apertures in a polymer wear plate 1002. In particular, a central bolt aperture 1004 is formed, as well as a set of surrounding apertures 1008. The surrounding apertures 1008, with the bolt aperture 1004, define a bolt support ring 1012 that is supported by four bolt support stays 1016. While four bolt support stays 1016 are used in this embodiment, it will be appreciated that fewer or more bolt support stays can be employed. The bolt support stays 1016 are non-radial so that depression of the bolt support ring 1012 relative to a plane of the wear plate 1002 is possible via tensioning and torqueing of the bolt support stays 1016. In other embodiments, the apertures 1004, 1008 can be formed via any other suitable cutting, routing, or molding means.

Figure 30:
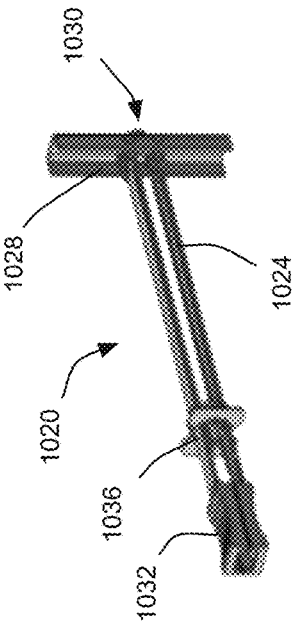
FIG. 30 shows a bolt anchor for use with the wear plate of FIG. 29.

FIG. 30 shows a toggle anchor 1020 that is used in conjunction with the holddown 1000 of FIG. 29. The toggle anchor 1020 has a pair of plastic rails 1024, a first end of each of which is pivotally secured a toggle 1028. The toggle 1028 has a central threaded through hole 1030. The rails 1024 have a set of teeth on their outer surface. When the rails 1024 are aligned longitudinally, the toggle 1028 is oriented perpendicularly to a longitudinal axis of the rails 1024. A finger grip 1032 is secured to a second end of each of the rails 1024. The finger grips 1032 have a shape or surface features to enable sliding longitudinal displacement relative to one the other. The rails 1024 pass through an interior aperture of a retention plate 1036. Longitudinal axial displacement of the finger grips 1032 causes a longitudinal axis of the toggle 1028 to pivot towards the longitudinal axis of the rails 1024 to enable the fitting of the toggle 1028 and the rails 1024 through the aperture 1004 of the wear plate 1002 when the wear plate 1002 is positioned atop of the set of modular grid panels 812. Once the toggle 1028 is fitted through the aperture 1004 and positioned through a cell of one of the modular grid panels 812, the finger grips 1032 can be realigned axially to cause the toggle 1028 to pivot towards a perpendicular orientation relative to the longitudinal axis of the rails 1024. The toggle anchor 1020 can then be pulled upward to cause the toggle 1028 to engage a bottom surface of the modular grid panel 812. The retention plate 1036 can then be slid down the rails 1024 towards the bolt support ring 1012 with some force to pass over the teeth of the rails 1024 until the retention plate 1036 abuts against the bolt support ring 1012 and is held from movement along the longitudinal axis of the rails 1024 to retain the toggle 1028 firmly against the modular grid panel 812. The upper portion of the rails 1024 extending above the retention plate 1036 can then be snapped off.

Figure 31A:
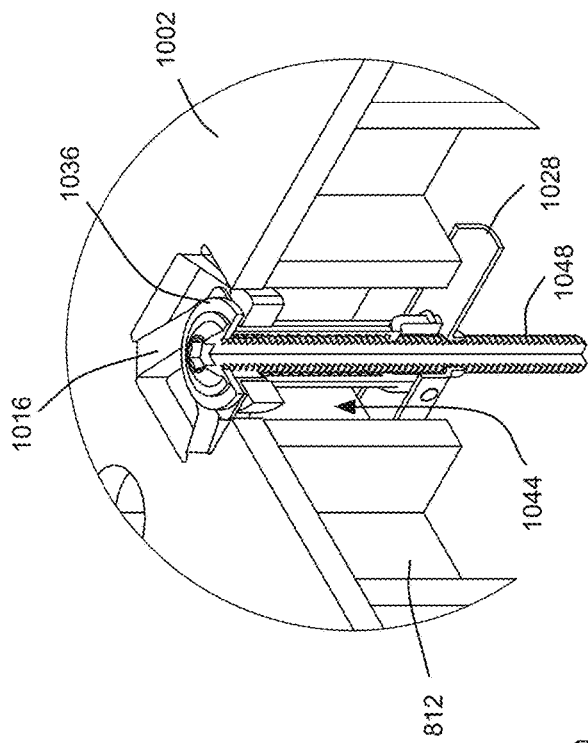
FIGS. 31A and 31B show the wear plate of FIG. 29 after being secured to a modular grid panel using the bolt anchor of FIG. 30.
Figure 31B:
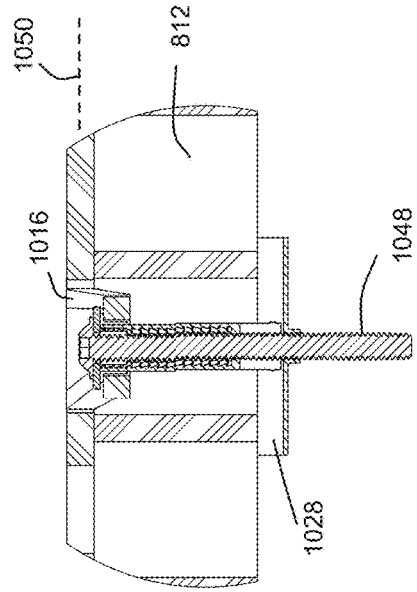

FIGS. 31A and 31B show the wear plate 1002 secured to a modular grid panel 812 via the toggle anchor 1020. The wear plate 1002, when positioned atop of the modular grid panel 812, has its holddown 1000 positioned generally centrally over an open cell 1044 of the modular grid panel 812. A bolt 1048 is inserted into the bolt aperture 1004 and threaded into the threaded through hole 1030 of the toggle 1028 to secure the toggle against the modular grid panel 812. As the bolt 1048 is turned, the holddown 1000 is deformed, with the bolt support ring 1012 being pulled towards the toggle 1028, thereby deforming the bolt support stays 1016 and securing the wear plate 1002 to the modular grid panel 812. The head of the bolt 1048 becomes recessed below the top plane of the wear plate 1002. Rotation of the bolt 1044 is terminated once the head of the bolt 1044 sits at least below a maximum wear level 1050 of the wear plate 1002. As the wear plate 1002 is scheduled to be replaced on or before wearing down of the surface of the wear plate 1002 to the maximum wear level 1050, an endless belt travelling over the wear plate 1002 should not contact the bolt 1048.

Figure 22:
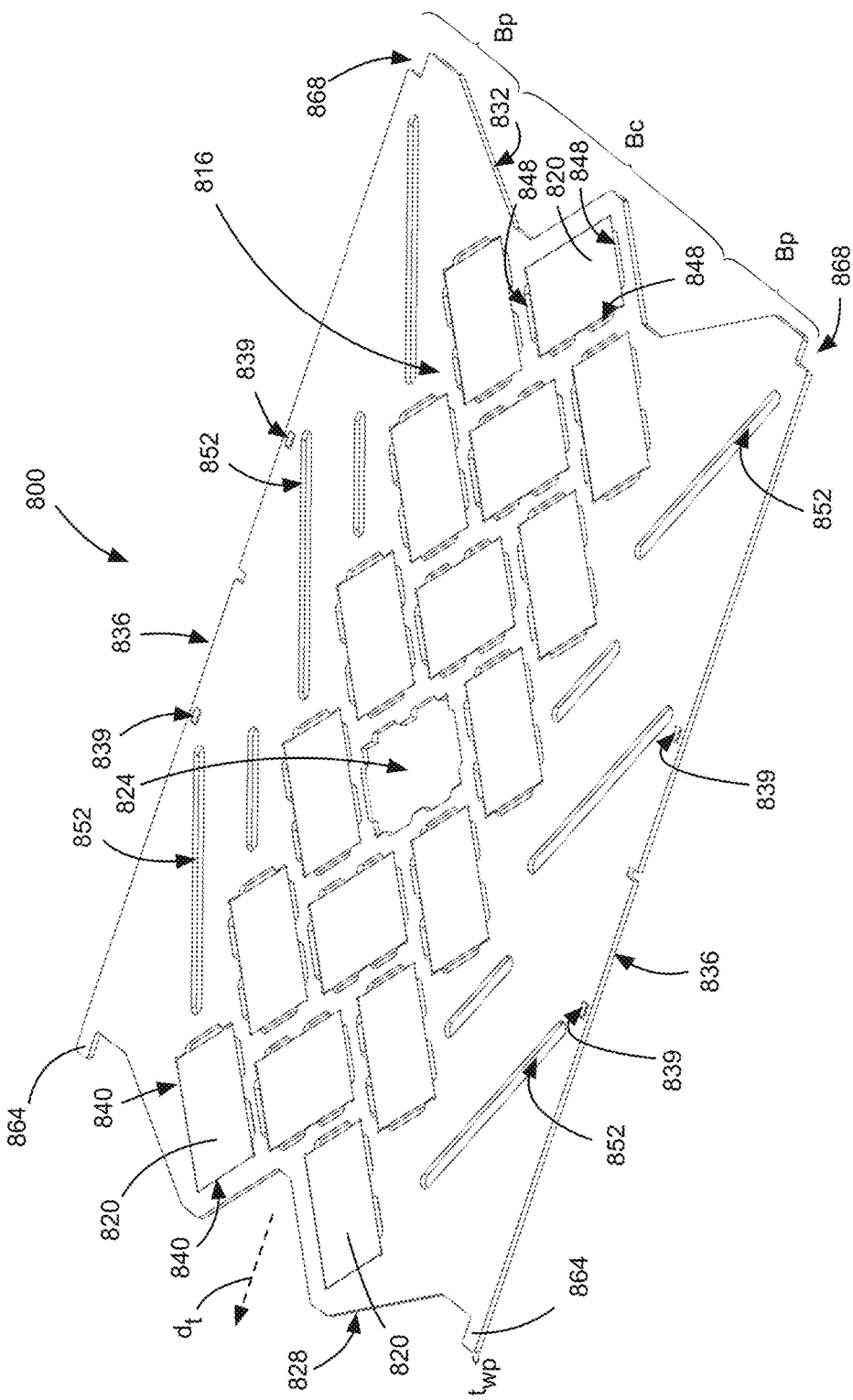
FIG. 22 shows a wear plate having ceramic inserts in accordance with another embodiment.
Figure 24:
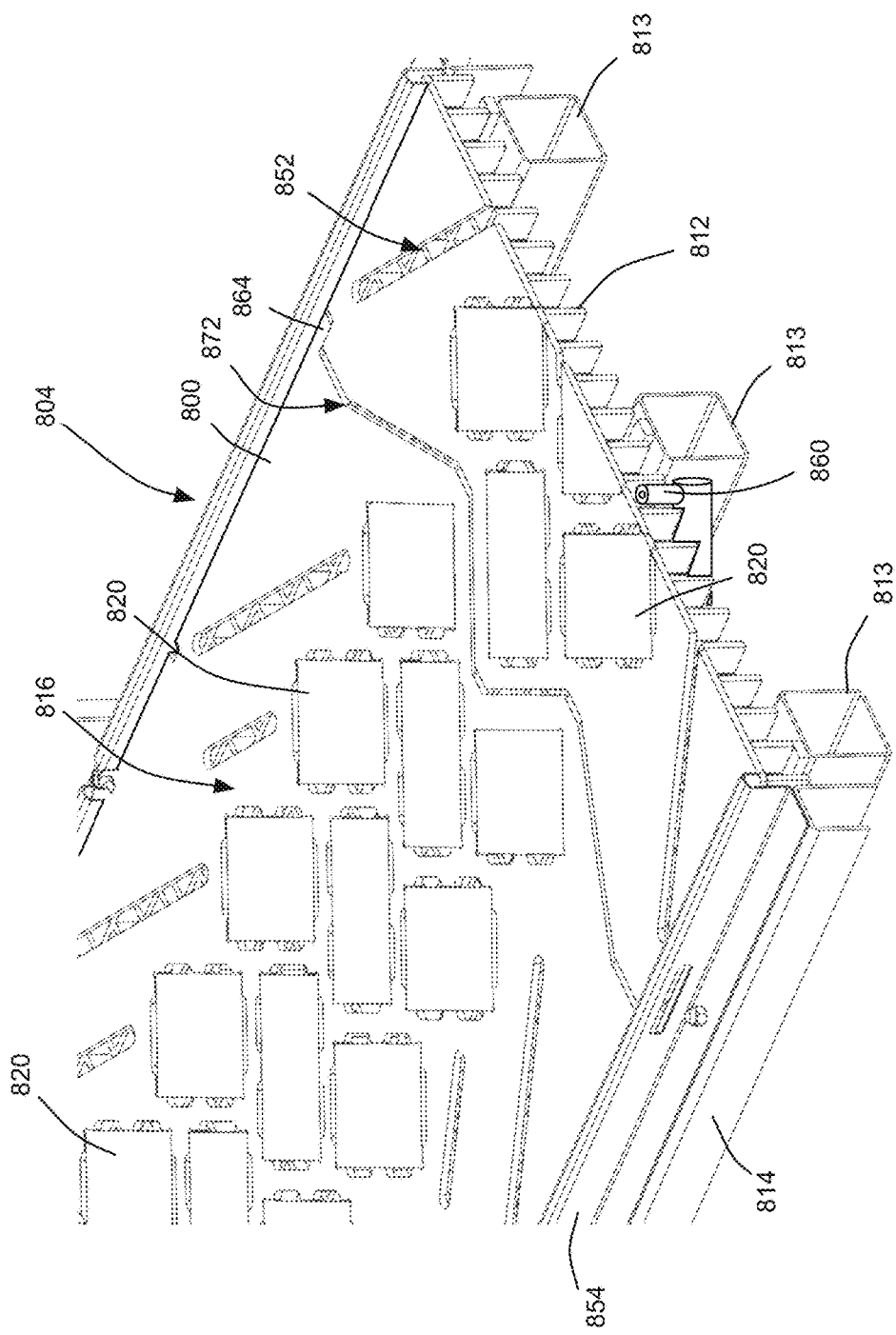
FIG. 24 is a perspective section view of a set of wear plates of FIG. 22 deployed as part of a support deck for an endless belt.
Figure 32:
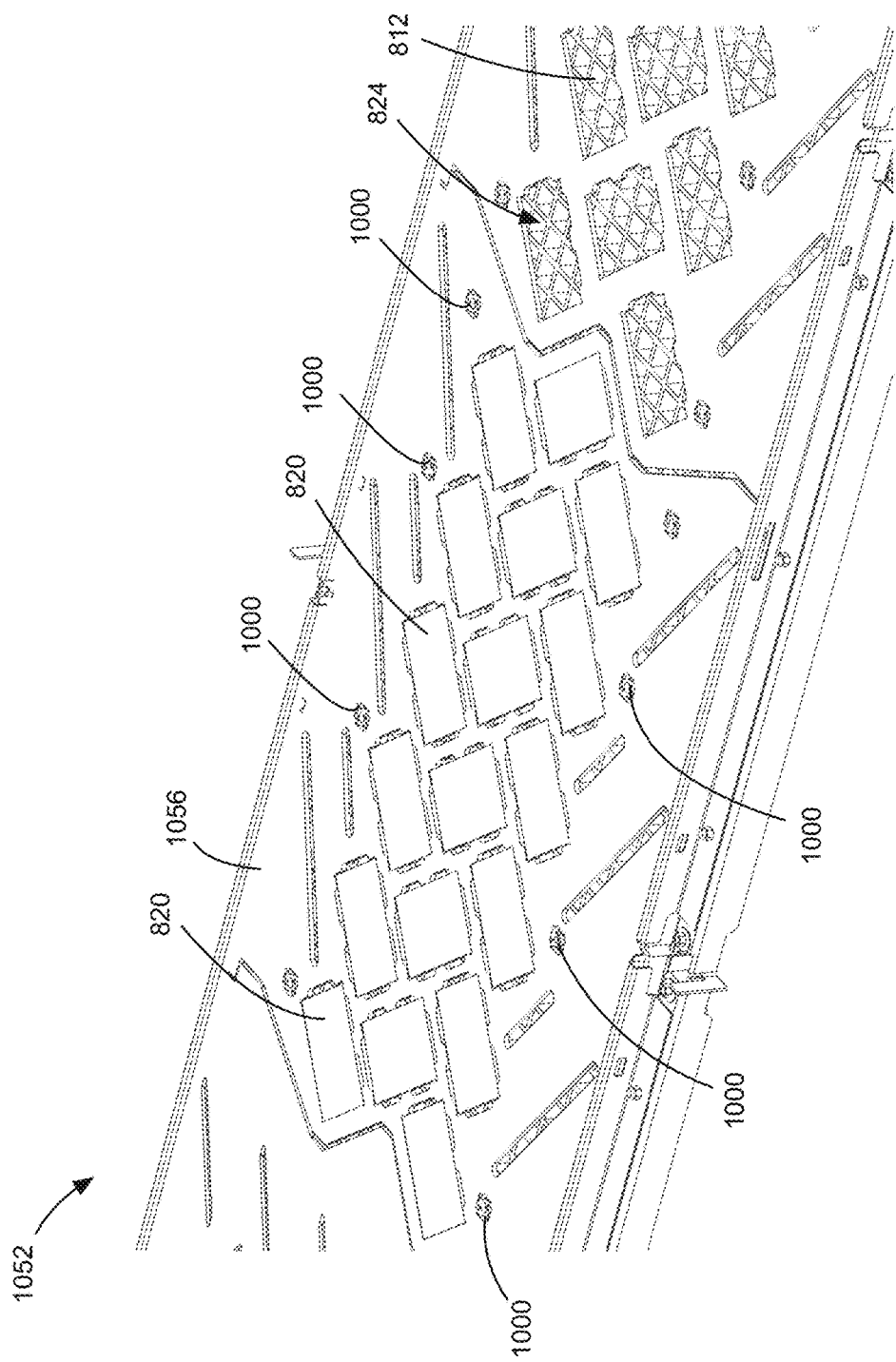
FIG. 32 is a perspective view of a support deck similar to that of FIG. 25 employing a set of wear plates including holddowns as shown in FIGS. 29 to 31B.

FIG. 32 shows a support deck 1052 similar to that of FIG. 25, wherein a set of wear plates 1056 similar to those of FIGS. 22, 24, and 25 have been produced with the holddowns 100 of FIGS. 29 to 31B. The holddowns 1000 when secured to the modular grid panels 812, exposed in a region where the ceramic inserts 820 have not yet been placed in the openings 824 of the wear plates 1056. The holddown arrangement of FIGS. 29 to 31 is particularly useful where it is desired to secure the wear plate 1056 to the modular grid panels 812 between lateral sides of the wear plates 1056 to avoid shifting and warping thereof. As the bolt support stays 1016 of the holddowns 1000 enable some degree of deformation, and as the cells of the modular grid panels 812 are somewhat large, expansion of the wear plates 1056 is permitted.

In other embodiments where the wear plates do not fully span the distance between the edge guides, holddowns like those of FIGS. 29 to 32 can be used to hold down the wear plates at least where they are not held down by the edge guides to the modular grid panels or other support structure.

Persons skilled in the art will appreciate that there are yet more alternative implementations and modifications possible, and that the above examples are only illustrations of one or more implementations. The scope, therefore, is only to be limited by the claims appended hereto and any amendments made thereto.

The invention claimed is:

1. A conveyor system, comprising:
an endless belt mounted in a longitudinal direction through a service line, the endless belt having an upper transport portion adapted to move a wheeled structure through the service line, and a lower return portion; and
a support deck positioned below the upper transport portion of the endless belt to support the endless belt, the support deck having a belt contact surface extending along a top of the support deck and in contact with the upper transport portion of the endless belt, the belt contact surface being at least partially constructed from a material that is at least partially a polymer, the belt contact surface having a set of inserts having a greater abrasion resistance than the material.

2. The conveyor system of claim 1, wherein the belt contact surface comprises a set of wear plates formed from the material.

3. The conveyor system of claim 2, wherein the material is at least partially thermoplastic.

4. The conveyor system of claim 3, wherein the material is at least partially polyethylene.

5. The conveyor system of claim 4, wherein the material is at least partially ultra-high-molecular-weight polyethylene.

6. The conveyor system of claim 4, wherein the material is at least partially high-density polyethylene.

7. The conveyor system of claim 2, further comprising:
a belt rinsing system including a rinsing system conduit arrangement connectable to a source of rinsing system liquid, and at least one belt rinsing arrangement, wherein each of the at least one belt rinsing arrangement includes
a rinsing system dirt pass-through aperture in the support deck, over which the upper transport portion of the endless belt travels during operation; and
at least one rinsing system outlet from the rinsing system conduit arrangement positioned proximate to the rinsing system dirt pass-through aperture and positioned to eject rinsing system liquid onto the endless belt upstream from a downstream edge of the rinsing system dirt pass-through aperture in order to capture at least some of the ejected liquid through the rinsing system dirt pass-through aperture.

8. The conveyor system of claim 2, wherein each of the set of wear plates has openings in which the set of inserts are received.

9. The conveyor system of claim 8, wherein the inserts have lateral sides, each of the lateral sides being oblique to a longitudinal direction of travel of the endless belt.

10. The conveyor system of claim 9, wherein each of the set of inserts has four lateral sides, each of the lateral sides forming an angle with the longitudinal direction of travel of the endless belt of between 40 degrees and 50 degrees.

11. The conveyor system of claim 9, wherein each of the set of wear plates has a leading edge and a trailing edge dimensioned to mate with the leading edge of another of the set of wear plates, each of the leading edge and the trailing edge having oblique edge segments oblique to the longitudinal direction of travel of the endless belt and generally parallel to a closest one of the lateral sides of an adjacent one of the set of inserts.

12. The conveyor system of claim 9, wherein the set of inserts are configured in a central band extending along the longitudinal direction of travel of the endless belt, the central band extending laterally across between 30% and 80% of a lateral width of the set of wear plates.

13. The conveyor system of claim 8, further comprising:
a belt rinsing system including a rinsing system conduit arrangement connectable to a source of rinsing system liquid, and at least one belt rinsing arrangement, wherein each of the at least one belt rinsing arrangement includes
a rinsing system dirt pass-through aperture in the support deck positioned, over which the upper transport portion of the endless belt travels during operation; and
at least one rinsing system outlet from the rinsing system conduit arrangement positioned proximate to the rinsing system dirt pass-through aperture and positioned to eject rinsing system liquid onto the endless belt upstream from a downstream edge of the rinsing system dirt pass-through aperture in order to capture at least some of the ejected liquid through the rinsing system dirt pass-through aperture.

14. The conveyor system of claim 13, wherein the set of inserts are configured in a central band extending along the longitudinal direction of travel of the endless belt, the central band extending laterally across between 30% and 80% of a lateral width of the set of wear plates.

15. The conveyor system of claim 14, wherein the rinsing system dirt pass-through aperture is spaced laterally from the central band.

16. The conveyor system of claim 13, wherein the openings and the set of inserts are designed so that the openings are at least partially unobstructed when the set of inserts are positioned therein, thereby defining the rinsing system dirt pass-through aperture.

17. The conveyor system of claim 8, wherein the inserts and the openings are dimensioned to inhibit upward escape of the inserts from the openings when the wear plates are positioned at the top of the support structure.

18. The conveyor system of claim 8, wherein a compressible layer is positioned under the inserts to facilitate depression of the set of inserts relative to the set of wear plates.

19. A belt contact surface for a conveyor system, the conveyor system having an endless belt mounted in a longitudinal direction through a service line, the endless belt having an upper transport portion adapted to move a wheeled structure through the service line, and a lower return portion, a support deck positioned below the upper transport portion of the endless belt to support the endless belt, the belt contact surface being dimensioned to extend along a top of the support deck and contact the upper transport portion of the endless belt, the belt contact surface being constructed from a material that is at least partially polymer, the belt contact surface being interspersed with inserts having a greater abrasion resistance than the material.

* * * * *